US008493585B2

(12) United States Patent
Muto

(10) Patent No.: US 8,493,585 B2
(45) Date of Patent: Jul. 23, 2013

(54) IMAGE PROCESSING SYSTEM INCLUDING A FIRST IMAGE PROCESSING APPARATUS FOR TRANSMITTING A JOB AND A SECOND IMAGE PROCESSING APPARATUS FOR RECEIVING AND EXECUTING THE JOB

(75) Inventor: Tsuyoshi Muto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 12/563,113

(22) Filed: Sep. 19, 2009

(65) Prior Publication Data
US 2010/0079800 A1 Apr. 1, 2010

(30) Foreign Application Priority Data
Oct. 1, 2008 (JP) ................................ 2008-256637

(51) Int. Cl.
*G06K 15/00* (2006.01)
*G06F 3/12* (2006.01)

(52) U.S. Cl.
USPC ............ 358/1.14; 358/1.15; 358/1.9; 399/79; 399/80; 705/52; 705/14.24; 705/14.25; 705/68; 705/77

(58) Field of Classification Search
USPC ................ 358/1.13–1.15; 705/52, 53, 54, 60, 705/63, 68, 75, 76, 77, 14.23–14.25; 399/79, 399/80; 710/15–19
See application file for complete search history.

(56) References Cited

U.S. PATENT DOCUMENTS

| 5,146,344 | A  | * | 9/1992  | Bennett et al. ................ 358/296 |
| 5,537,550 | A  | * | 7/1996  | Russell et al. ................ 709/224 |
| 6,202,092 | B1 | * | 3/2001  | Takimoto ...................... 709/225 |
| 7,119,916 | B2 | * | 10/2006 | Kato et al. .................... 358/1.15 |
| 7,379,917 | B2 | * | 5/2008  | Yoshida et al. ................. 705/52 |
| 8,060,921 | B2 | * | 11/2011 | Lovat et al. ....................... 726/8 |
| 8,130,396 | B2 | * | 3/2012  | Ikegami et al. ............. 358/1.15 |
| 2002/0048036 | A1 | * | 4/2002 | Nakagawa et al. .......... 358/1.14 |
| 2003/0174356 | A1 | * | 9/2003 | Cherry et al. ................ 358/1.15 |
| 2005/0163514 | A1 | * | 7/2005 | Hwang ............................. 399/8 |
| 2007/0285717 | A1 |   | 12/2007 | Muto et al. |
| 2008/0137134 | A1 | * | 6/2008 | Igarashi ...................... 358/1.15 |
| 2009/0244626 | A1 | * | 10/2009 | Mangiacotti et al. ........ 358/1.18 |

FOREIGN PATENT DOCUMENTS
JP 11196212 7/1999

* cited by examiner

*Primary Examiner* — Dennis Dicker
(74) *Attorney, Agent, or Firm* — Fitzpatrick, Cella, Harper & Scinto

(57) ABSTRACT

The execution of an image processing job is limited using a printing amount by an image processing job that has already been executed and a printing amount that is scheduled to be printed by an image processing job that has already been transmitted but not yet executed. To accomplish this, a multi-function peripheral manages a first printing amount that has already been printed by a executed print job and a second printing amount that is scheduled to be printed by a print job that has been transmitted from the multi-function peripheral to a printer and that has not yet been executed in association with a user ID, and determines, before transmitting the print job, whether or not the total of a third printing amount that is scheduled to be printed by the print job, the first printing amount and the second printing amount exceeds an upper limit amount.

14 Claims, 15 Drawing Sheets

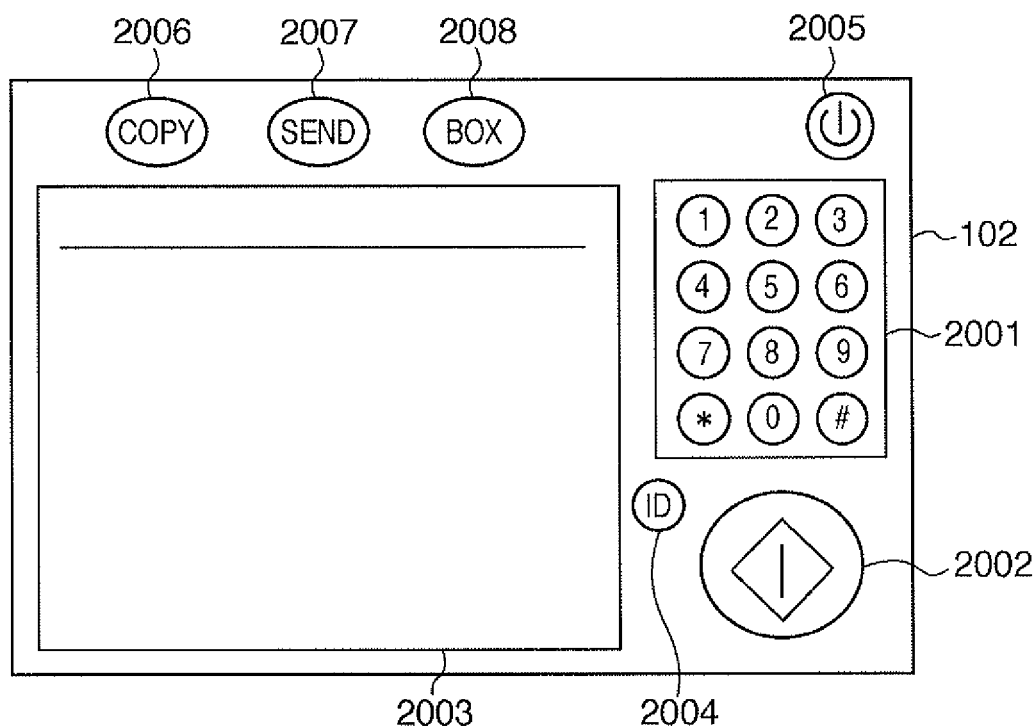

| ID | NUMBER OF PRINTABLE PAGES | NUMBER OF PRINTED PAGES |
|---|---|---|
| tetsuya | 1000 | 990 |
| koji | 2000 | 1500 |
| sayuri | 1000 | 50 |
| may | 2000 | 2000 |
| yayoi | 1000 | 8560 |

| PRINT JOB NUMBER | NUMBER OF PAGES | ID |
|---|---|---|
| 1 | 10 | tetsuya |
| 100 | 500 | koji |
| 101 | 20 | sayuri |
| 102 | | |
| 200 | | |

F I G. 18
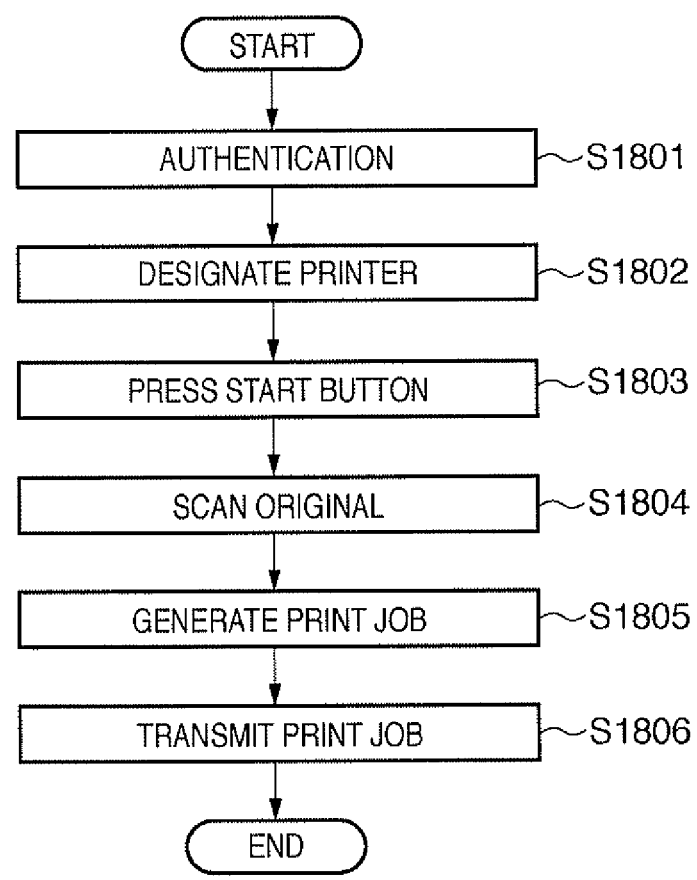

IMAGE PROCESSING SYSTEM INCLUDING A FIRST IMAGE PROCESSING APPARATUS FOR TRANSMITTING A JOB AND A SECOND IMAGE PROCESSING APPARATUS FOR RECEIVING AND EXECUTING THE JOB

BACKGROUND OF THE INVENTION

1. Field of the Invention

The present invention relates to an image processing system that includes a first image processing apparatus that transmits an image processing job and a second image processing apparatus that receives the image processing job transmitted by the first image processing apparatus and executes the job, a method for controlling the same, and a program.

2. Description of the Related Art

It is known that conventionally, an image processing apparatus manages the amount of printing (e.g., the number of sheets or pages printed, the amount of data printed, and so on) that is printed through execution of an image processing job in association with a user ID. This is often carried out for the purpose of letting a user know the amount used for a predetermined period of time, and charging the user for the amount used.

It is also known that, for example, as described in Japanese Patent Laid-Open No. 11-196212, an image processing apparatus manages not only the amount printed by the image processing apparatus, but also the amount printed by another image processing apparatus to which the image processing apparatus has requested a print operation.

More specifically, according to Japanese Patent Laid-Open No. 11-196212, an image processing apparatus A first scans an original to generate image data, and then, transmits the generated image data to an image processing apparatus B that is connected to the image processing apparatus A via a network.

The image processing apparatus B executes a print process based on the image data received from the image processing apparatus A, and after the print process ends, the image processing apparatus B notifies the image processing apparatus A that the print process has ended. Upon receiving the notification, the image processing apparatus A updates a print counter value that it manages.

With the above configuration disclosed in Japanese Patent Laid-Open No. 11-196212, an image processing apparatus can manage not only the amount printed by the image processing apparatus, but also the amount printed by another image processing apparatus.

Recently, an image processing apparatus has been conceived that not only manages the actual printing amount, but also limits the printing amount that can be used by each user. In such an apparatus, the upper limit amount is predetermined for each user by the administrator, and when the amount used by a user has reached his/her set upper limit amount, the execution of an image processing job by that user is limited thereafter.

However, as described by taking Japanese Patent Laid-Open No. 11-196212 as an example, with a configuration in which the image processing apparatus A transmits an image processing job to the image processing apparatus B, and the amount printed by the image processing apparatus B is managed by the image processing apparatus A, such a limitation based on the upper limit amount may not work well in some cases.

That is, as described in Japanese Patent Laid-Open No. 11-196212, when a configuration is adopted in which the image processing apparatus A updates the counter value based on a notification from the image processing apparatus B after an image processing job has been executed, the image processing apparatus A does not update the counter until it receives a notification from the image processing apparatus B.

In other words, regardless of the fact that an image processing job has already been transmitted to the image processing apparatus B, the printing amount that is scheduled to be printed by the transmitted image processing job will not be reflected in the counter of the image processing apparatus A until the image processing apparatus A receives a notification from the image processing apparatus B.

Then, even if a configuration is adopted in which whether or not the counter value will exceed an upper limit amount is determined before transmitting an image processing job, the determination is made without consideration of the amount of printing of an image processing job that has already been transmitted to the image processing apparatus B but that has not yet been executed.

Consequently, when a plurality of image processing jobs are transmitted in parallel, a problem can occur in that when the image processing apparatus A updates the counter based on the amount of printing by the image processing apparatus B in response to a notification from the image processing apparatus B indicating that the image processing jobs have been executed, the counter value has already exceeded the upper limit amount.

SUMMARY OF THE INVENTION

The present invention enables limiting of the execution of an image processing job to be realized using the amount of printing that has been printed by an already executed image processing job and the amount of printing that is scheduled to be printed by an image processing job that has already been transmitted but that has not yet been executed.

One aspect of the present invention provides an image processing system comprising: a first image processing apparatus that transmits an image processing job, and a second image processing apparatus that receives the image processing job transmitted by the first image processing apparatus and executes the received image processing job; the first image processing apparatus comprising: a generation unit that generates an image processing job to be transmitted to the second image processing apparatus, a management unit that manages a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus, a determination unit that, before the image processing job generated by the generation unit is transmitted to the second image processing apparatus, determines whether or not a total of a third printing amount that is scheduled to be printed by the generated image processing job, the first printing amount and the second printing amount exceeds a predetermined upper limit amount, a transmission unit that, when the total has been determined to not exceed the upper limit amount as a result of determination by the determination unit, transmits the generated image processing job to the second image processing apparatus, an adding unit that adds, in a case where the transmission unit transmits the generated image processing job, the third printing amount to the second printing amount to obtain a new second printing amount, and causes the management unit to manage the new second printing amount, and an update unit that, when a result of execution by the second image processing apparatus of the image processing job transmitted by the transmission unit is sent from the second image processing apparatus, updates the first printing amount and the new second printing amount; and the second image processing apparatus comprising: a receiving unit that receives the image processing job from the first image processing apparatus, a processing unit that executes the image processing job received by the receiving unit, and a notification unit that notifies the first image processing apparatus of a result of execution of the image processing job executed by the processing unit.

Another aspect of the present invention provides an image processing system comprising: a first image processing apparatus that transmits an image processing job, a second image processing apparatus that receives the image processing job transmitted by the first image processing apparatus and executes the received image processing job, and an information processing apparatus; the first image processing apparatus comprising: a generation unit that generates an image processing job to be transmitted to the second image processing apparatus, a query unit that, before the image processing job generated by the generation unit is transmitted to the second image processing apparatus, notifies the information processing apparatus of a third printing amount that is scheduled to be printed by the generated image processing job and queries whether or not the generated image processing job can be transmitted, and a transmission unit that, when a response that indicates that the generated image processing job can be transmitted is sent from the information processing apparatus as a result of the query by the query unit, transmits the generated image processing job to the second image processing apparatus; the second image processing apparatus comprising: a receiving unit that receives the image processing job from the first image processing apparatus, a processing unit that executes the image processing job received by the receiving unit, and a notification unit that notifies the information processing apparatus of a result of execution of the image processing job executed by the processing unit; and the information processing apparatus comprising: a management unit that manages a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus, a determination unit that, in response to the query from the first image processing apparatus, determines whether or not a total of the third printing amount that is scheduled to be printed by the generated image processing job, the first printing amount and the second printing amount exceeds a predetermined upper limit, a response unit that provides a response that indicates whether or not to permit transmission of the generated image processing job to the first image processing apparatus based on a result of determination by the determination unit, and an update unit that, when a result of execution by the second image processing apparatus of the image processing job transmitted by the first image processing apparatus is sent from the second image processing apparatus, updates the first printing amount and a new second printing amount.

Still another aspect of the present invention provides an image processing system comprising: a first image processing apparatus that transmits an image processing job, a second image processing apparatus that receives the image processing job transmitted by the first image processing apparatus and executes the received image processing job, and an information processing apparatus; the first image processing apparatus comprising: a generation unit that generates an image processing job to be transmitted to the second image processing apparatus, and a transmission unit that transmits the image processing job generated by the generation unit to the second image processing apparatus; the second image processing apparatus including: a receiving unit that receives the image processing job from the first image processing apparatus, a query unit that, before the received image processing job is executed, notifies the information processing apparatus of a third printing amount that is scheduled to be printed by the received image processing job and queries whether or not the received image processing job can be executed, a processing unit that, when a response that indicates that the received image processing job can be executed is sent from the information processing apparatus as a result of the query by the query unit, executes the received image processing job, and a notification unit that notifies the information processing apparatus of a result of execution of the image processing job executed by the processing unit; and the information processing apparatus comprising: a management unit that manages a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus, a determination unit that, in response to the query from the second image processing apparatus, determines whether or not a total of the third printing amount that is scheduled to be printed by the received image processing job, the first printing amount and the second printing amount exceeds a predetermined upper limit, a response unit that provides a response that indicates whether or not to permit execution of the received image processing job to the second image processing apparatus based on a result of determination by the determination unit, and an update unit that, when a result of execution by the second image processing apparatus of the image processing job transmitted by the first image processing apparatus is sent from the second image processing apparatus, updates the first printing amount and a new second printing amount.

Yet another aspect of the present invention provides a method for controlling an image processing system comprising a first image processing apparatus that transmits an image processing job, and a second image processing apparatus that receives the image processing job transmitted by the first image processing apparatus and executes the received image processing job, the method comprising: by the first image processing apparatus, generating an image processing job to be transmitted to the second image processing apparatus; managing a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus; determining whether or not a total of a third printing amount that is scheduled to be printed by the generated image processing job, the first printing amount and the second printing amount exceeds a predetermined upper limit amount before the image processing job generated in the generation step is transmitted to the second image processing apparatus; transmitting the generated image processing job to the second image processing apparatus when the total has been determined to not exceed the upper limit amount as a result of determination in the determination step; adding, in a case where the generated image processing job is transmitted in the transmitting step, the third printing amount to the second printing amount to obtain a new second printing amount, and causing the management step to manage the new second printing amount, and updating the first printing amount and the new second printing amount when a result of execution by the second image processing apparatus of the image processing job transmitted in the transmission step is sent from the second image processing apparatus; and by the second image processing apparatus, receiving the image processing job from the first image processing apparatus; executing the image processing job received in the receiving step; and notifying the first image processing apparatus of a result of execution of the image processing job executed in the executing step.

Still yet another aspect of the present invention provides a method for controlling an image processing system comprising a first image processing apparatus that transmits an image processing job, a second image processing apparatus that receives the image processing job transmitted by the first image processing apparatus and executes the received image processing job, and an information processing apparatus, the method comprising: by the first image processing apparatus, generating an image processing job to be transmitted to the second image processing apparatus; notifying the information processing apparatus of a third printing amount that is scheduled to be printed by the generated image processing job and querying whether or not the generated image processing job can be transmitted before the image processing job generated in the generation step is transmitted to the second image processing apparatus; and transmitting the generated image processing job to the second image processing apparatus when a response that indicates that the generated image processing job can be transmitted is sent from the information processing apparatus as a result of the query in the query step; by the second image processing apparatus, receiving the image processing job from the first image processing apparatus; executing the image processing job received in the receiving step; and notifying the information processing apparatus of a result of execution of the image processing job executed in the executing step; by the information processing apparatus, managing a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus; determining whether or not a total of the third printing amount that is scheduled to be printed by the generated image processing job, the first printing amount and the second printing amount exceeds a predetermined upper limit in response to the query from the first image processing apparatus; providing a response that indicates whether or not to permit transmission of the generated image processing job to the first image processing apparatus based on a result of determination in the determination step; and updating the first printing amount and a new second printing amount when a result of execution by the second image processing apparatus of the image processing job transmitted by the first image processing apparatus is sent from the second image processing apparatus.

Yet still another aspect of the present invention provides a method for controlling an image processing system comprising a first image processing apparatus that transmits an image processing job, a second image processing apparatus that receives the image processing job transmitted by the first image processing apparatus and executes the received image processing job, and an information processing apparatus, the method comprising: by the first image processing apparatus, generating an image processing job to be transmitted to the second image processing apparatus; and transmitting the image processing job generated in the generation step to the second image processing apparatus; by the second image processing apparatus, receiving the image processing job from the first image processing apparatus; notifying the information processing apparatus of a third printing amount that is scheduled to be printed by the received image processing job and querying whether or not the received image processing job can be executed before the received image processing job is executed; executing the received image processing job when a response that indicates that the received image processing job can be executed is sent from the information processing apparatus as a result of the query in the query step; and notifying the information processing apparatus of a result of execution of the image processing job executed in the executing step; and by the information processing apparatus, managing a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus; determining whether or not a total of the third printing amount that is scheduled to be printed by the received image processing job, the first printing amount and the second printing amount exceeds a predetermined upper limit in response to the query from the second image processing apparatus; providing a response that indicates whether or not to permit execution of the received image processing job to the second image processing apparatus based on a result of determination in the determination step; and updating the first printing amount and a new second printing amount when a result of execution by the second image processing apparatus of the image processing job transmitted by the first image processing apparatus is sent from the second image processing apparatus.

Still yet another aspect of the present invention provides a computer-readable storage medium storing a computer program for causing a computer to execute the method for controlling the image processing system.

Further features of the present invention will be apparent from the following description of exemplary embodiments with reference to the attached drawings.

BRIEF DESCRIPTION OF THE DRAWINGS

FIG. 2 is a diagram showing an example of a configuration of an operation unit of a multi-function peripheral according to Embodiment 1.

FIG. 3 is a diagram showing an ID authentication table according to Embodiment 1.

FIG. 18 is a flowchart illustrating a processing procedure for transmitting a print job performed by a multi-function peripheral according to Embodiment 3.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Figure 1:
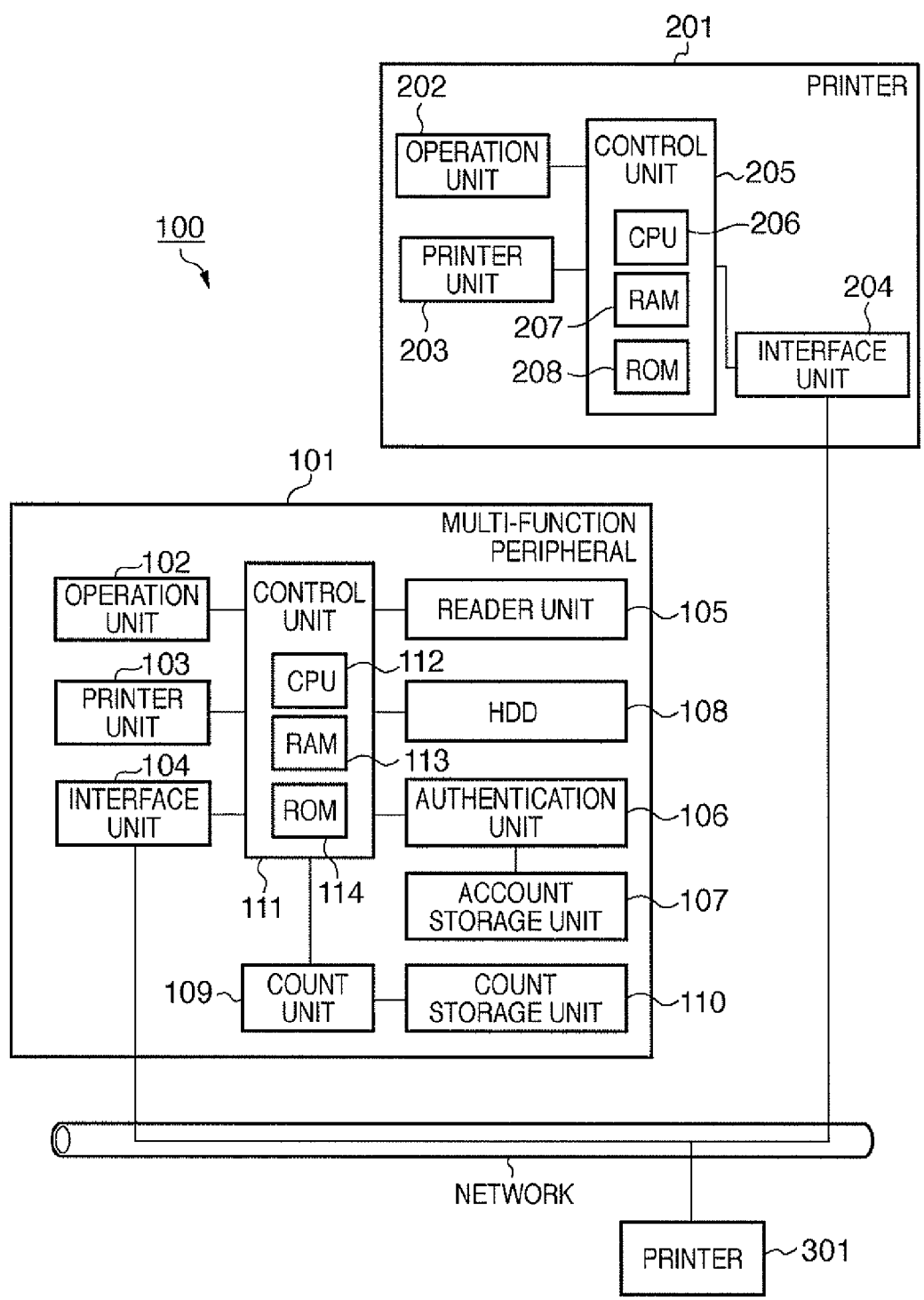
FIG. 1 is a block diagram showing an example of a configuration of an image processing system according to Embodiment 1.

Hereinafter, Embodiment 1 will be described with reference to FIGS. 1 to 14. FIG. 1 is a block diagram showing an example of a configuration of an image processing system according to Embodiment 1.

An image processing system 100 includes a multi-function peripheral 101, and printers 201 and 301 that are connected via a network. The present embodiment will be described taking a multi-function peripheral (MFP) and a single function printer (SFP) as examples of image processing apparatuses. However, other than these, various apparatuses such as a network scanner and a facsimile apparatus can be applied as image processing apparatuses.

The multi-function peripheral 101 includes an operation unit 102, a printer unit 103, an interface unit 104, a reader unit 105, an authentication unit 106, an account storage unit 107, a HDD (hard disk drive) 108, a count unit 109, a count storage unit 110, and a multi-function peripheral control unit 111. The multi-function peripheral 101 generates, transmits and executes print jobs, as well as counts the number of pages of print.

The operation unit 102 is a user interface, which is used as a display unit for displaying an operation procedure and as an input unit for generating a print job, selecting a printer, issuing an instruction to start printing, and the like performed by a user. The printer unit 103 records an image according to the image data received in response to an instruction from the multi-function peripheral control unit 111 onto a recording material such as paper. The interface unit 104 is an interface for communicating with image processing apparatuses such as the printers 201 and 301 and an information processing apparatus such as a server that are connected via a network, which transmits and receives print jobs, control information, events and the like via the network.

Examples of events that are transmitted from an image processing apparatus that executes image processing to an image processing apparatus that has requested the image processing include an end notification, a completion notification, and an interruption notification. The end notification is a notification that indicates that one page has been recorded onto a recording material. The completion notification is a notification that indicates that the execution of a received job has been completed. The interruption notification is a notification that indicates that image processing currently being executed has been interrupted.

The reader unit 105 reads out an original image and outputs the read-out image data to the multi-function peripheral control unit 111. The authentication unit 106 receives a user ID and a password from the multi-function peripheral control unit 111, determines whether or not there is a combination of the received user ID and password in the account storage unit 107, and outputs the result of authentication to the multi-function peripheral control unit 111. The account storage unit 107 pre-stores combinations of user IDs (hereinafter simply referred to as "IDs") and passwords that are identification information for each user or each department authenticated by this system.

The HDD 108 stores programs that control the system and a large quantity of relatively large-sized image data. The count unit 109 counts the amount formed onto a recording material through image processing, or in other words, a printing amount such as the number of printed pages, for each account, and stores the result in the count storage unit 110. The multi-function peripheral control unit 111 includes a CPU 112, a ROM 114 and a RAM 113. The CPU 112 loads a program stored in the ROM 114 or another storage medium into the RAM 113, executes the program, and thereby collectively controls the entire multi-function peripheral 101.

The printers 201 and 301 include an operation unit 202, a printer unit 203, an interface unit 204 and a printer control unit 205, and they receive a print job from the multi-function peripheral 101 and execute a print process in accordance with the print job.

The operation unit 202 is a user interface, which is used when displaying an operation procedure or when a user issues an instruction to control a print job. The printer unit 203 records the image of a print job onto a recording material. The interface unit 204 is an interface with the multi-function peripheral 101, and transmits and receives print jobs, control information, the results of executed processes and the like to and from the multi-function peripheral 101 via the network. The printer control unit 205 includes a CPU 206, a ROM 208 and a RAM 207. The CPU 206 loads a program stored in the ROM 208 or another storage medium into the RAM 207, executes the program, and thereby collectively controls the entire printer 201.

Next, the operation unit 102 of the multi-function peripheral 101 will be described with reference to FIG. 2. FIG. 2 is a diagram showing an example of a configuration of the operation unit of the multi-function peripheral according to Embodiment 1.

Reference numeral 2001 denotes a numeric keypad that is used to input numerical values. Reference numeral 2002 denotes a start key that is used to provide an instruction to start a scanning process. Reference numeral 2003 denotes a touch panel that is configured from a combination of a liquid crystal screen and a touch sensor, on which a settings screen is displayed for each mode and various detailed settings can be set by touching the displayed soft keys. Reference numeral 2004 denotes an ID key that is used to log into and out of the multi-function peripheral 101. Reference numeral 2005 denotes a power key that is used to turn the multi-function peripheral 101 on and off.

Reference numeral 2006 denotes a copy mode key that is used to select a copy function from among a plurality of functions. Reference numeral 2007 denotes a send key that is used to select an image send function from among a plurality of functions. As used herein, the image send function refers to a function of transferring an image read by the reader unit 105 or a file stored in a box (described later) to another apparatus by means of facsimile, email, or various network protocols. Reference numeral 2008 denotes a box key that is used to select a box function from among a plurality of functions. In the present embodiment, the box function refers to a function of storing an image information file that includes image data and a print format received from the host apparatus, or image data read out by the scanner in a specified area of the HDD 108 and issuing a print instruction through the operation unit 102 or the like.

Next, the information stored in the account storage unit 107 of the multi-function peripheral 101 will be described with reference to FIG. 3. FIG. 3 is a diagram showing an ID authentication table according to Embodiment 1.

An ID authentication table 3001 is pre-stored in the account storage unit 107. The ID authentication table 3001 stores IDs 3002 uniquely assigned in the image processing system 100 and corresponding passwords 3003 in association with each other. The IDs 3002 are represented by character strings in FIG. 3, but internally, they are stored with a unique numerical value corresponding to each ID.

Figure 4:
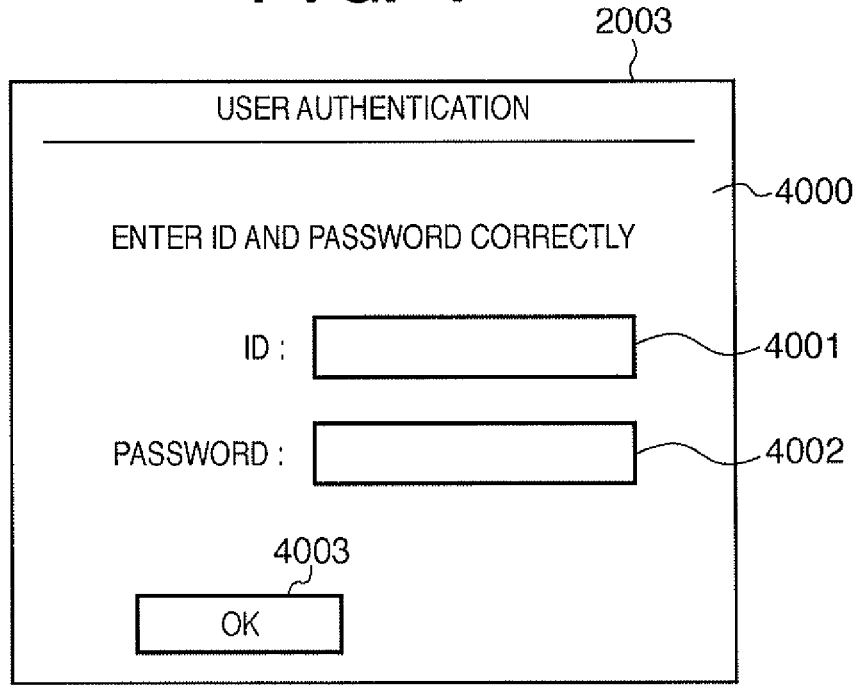
FIG. 4 is a diagram showing an example of an authentication screen according to Embodiment 1.
Figure 5:
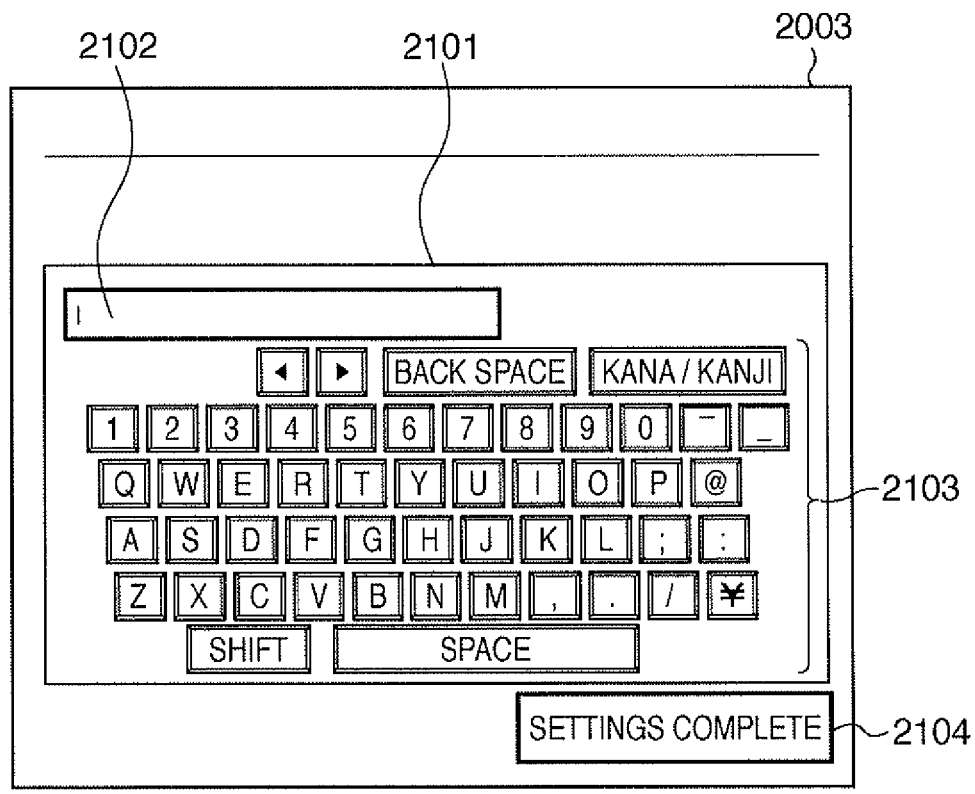
FIG. 5 is a diagram showing an example of an input window according to Embodiment 1.

Next, an authentication screen and an input window that are displayed on the touch panel 2003 of the operation unit 102 when logging into the multi-function peripheral 101 will be described with reference to FIGS. 4 and 5. FIG. 4 is a diagram showing an example of an authentication screen according to Embodiment 1. FIG. 5 is a diagram showing an example of an input window according to Embodiment 1.

In an authentication screen 4000 shown in FIG. 4, reference numeral 4001 denotes an ID input box. Reference numeral 4002 denotes a password input box. When the ID input box 4001 or the password input box 4002 is pressed, an input window 2101 shown in FIG. 5 is displayed on the touch panel 2003.

In the input window 2101 shown in FIG. 5, reference numeral 2102 denotes a display area for displaying input characters, in which information (a character string) being input is displayed. Reference numeral 2103 denotes a software keyboard 2103, with which characters to be displayed in the display area 2102 can be input. When a settings complete key 2104 is pressed, the authentication screen 4000 is displayed on the touch panel 2003. At this time, the character string that was displayed in the display area 2102 is displayed in the ID input box 4001 or the password input box 4002.

When an OK key 4003 displayed on the authentication screen 4000 is pressed, the multi-function peripheral control unit 111 sends the input ID and password to the authentication unit 106. The authentication unit 106 performs authentication using the combination of the ID and the password in the ID authentication table 3001, and sends the result of authentication to the multi-function peripheral control unit 111.

Figure 6:
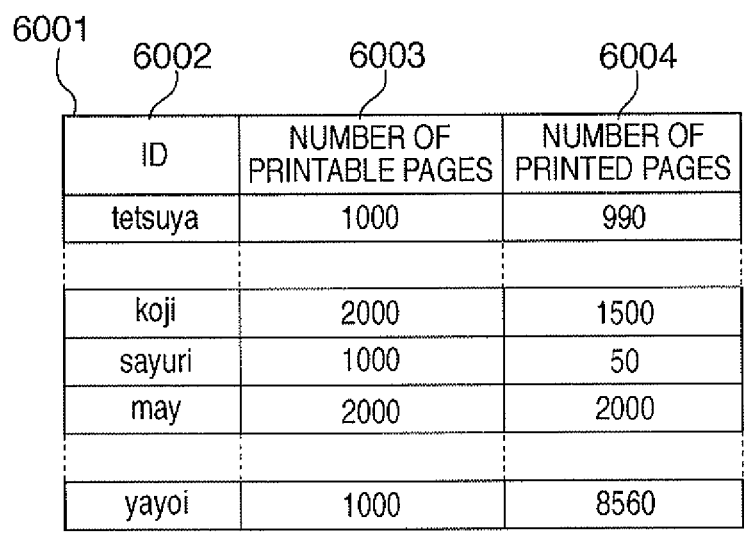
FIG. 6 is a diagram showing a page count table for each ID according to Embodiment 1.

Next, the information stored in the count storage unit 110 of the multi-function peripheral 101 will be described with reference to FIGS. 6 and 7. FIG. 6 is a diagram showing a page count table for each ID according to Embodiment 1.

A page count table for each ID 6001 is pre-stored in the count storage unit 110. The page count table for each ID 6001 stores IDs 6002 uniquely assigned in the image processing system 100, the number of printable pages 6003, and the number of printed pages 6004 (a first printing amount) in association with one another. The IDs 6002 are represented by character strings in FIG. 6, but internally, they are stored with a unique numerical value corresponding to each ID.

As used herein, the number of printable pages 6003 refers to the upper limit of the amount that can be formed for each corresponding ID 6002, or in other words, the number of pages that can be printed using the ID. Likewise, the number of printed pages 6004 refers to the amount that has already been formed using a corresponding ID 6002, or in other words, the number of pages that have already been printed by that user. Accordingly, referring to the ID "tetsuya" of FIG. 6, the number of printable pages 6003 is 1000 and the number of printed pages 6004 is 990, so the number of remaining pages that can be printed will be 10. Referring next to the ID "may", the value written in the number of printable pages 6003 matches the value written in the number of printed pages 6004, which means the execution of any more print jobs is prohibited.

Figure 7:
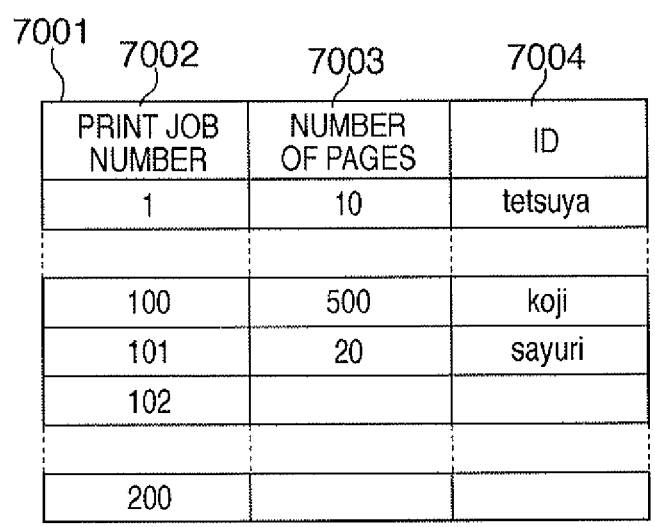
FIG. 7 is a diagram showing a provisional count table according to Embodiment 1.

FIG. 7 is a diagram showing a provisional count table according to Embodiment 1. A provisional count table 7001 is pre-stored in the count storage unit 110. The provisional count table 7001 stores print job numbers 7002 uniquely assigned in the image processing system 100, the number of pages to be printed 7003, and print job IDs 7004 in association with one another. The IDs 7004 are represented by character strings in FIG. 7, but internally, they are stored with a unique numerical value corresponding to each ID.

As used herein, the number of pages to be printed 7003 refers to the amount (a second printing amount) that is going to be formed by a print job that has already been transmitted to another apparatus by being executed later, or in other words, the number of pages that are scheduled to be printed. Also, such information is provided for all of the jobs that are being executed within the image processing system.

Print Job Transmission Control

Figure 8:
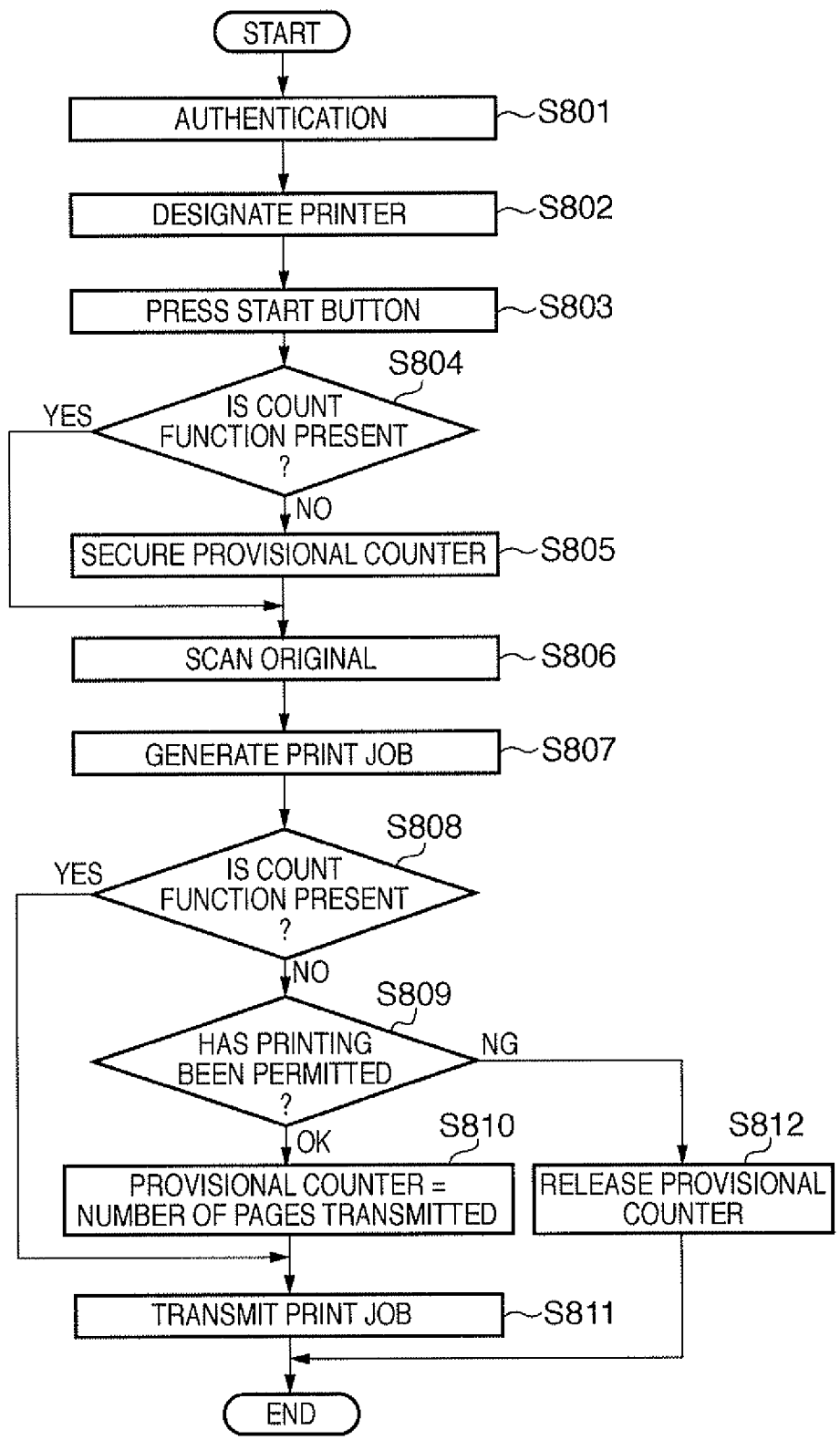
FIG. 8 is a flowchart illustrating a processing procedure for transmitting a print job performed by a multi-function peripheral according to Embodiment 1.

Print job transmission control will be described next with reference to FIGS. 8 to 11. FIG. 8 is a flowchart illustrating a processing procedure for transmitting a print job performed by the multi-function peripheral according to Embodiment 1. The process described below is collectively controlled by the CPU 112. In the description given below, it is assumed that the multi-function peripheral 101 is used as a first image processing apparatus that transmits an image processing job to another image processing apparatus, and the printer 201 is used as a second image processing apparatus that receives and executes the image processing job.

When the ID key 2004 is pressed by a user, in step S801, the CPU 112 displays the authentication screen 4000 shown in FIG. 4 on the touch panel 2003 of the operation unit 102, and executes user authentication. Specifically, when an ID and a password are input, and then the OK key 4003 is pressed by the user, user authentication is performed. If the authentication is successful, the process advances to step S802.

Figure 9:
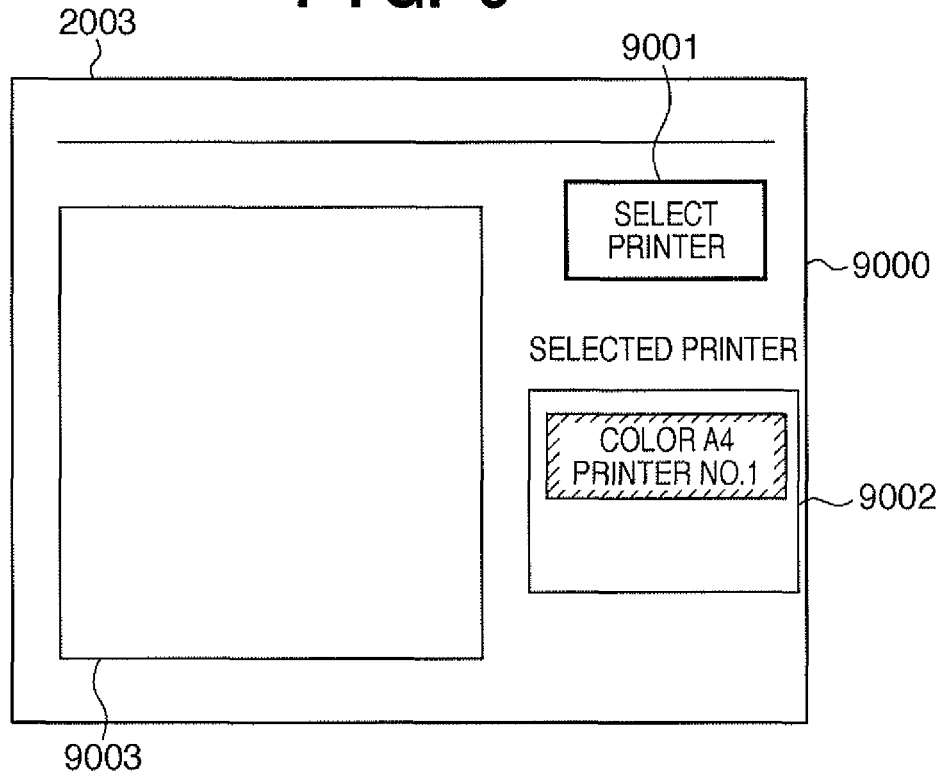
FIG. 9 is a diagram showing an example of a printer selection screen according to Embodiment 1.

In step S802, the CPU 112 displays a printer selection screen 9000 shown in FIG. 9 on the touch panel 2003 to prompt the user to select a printer with which the print job is executed. FIG. 9 is a diagram showing an example of a printer selection screen according to Embodiment 1. Reference numeral 9001 shown in FIG. 9 denotes a printer selection button for displaying a printer selection screen 9010, which will be described later. Reference numeral 9002 denotes a display area in which a selected printer is displayed. Reference numeral 9003 denotes an input area in which various print settings are input.

Figure 10:
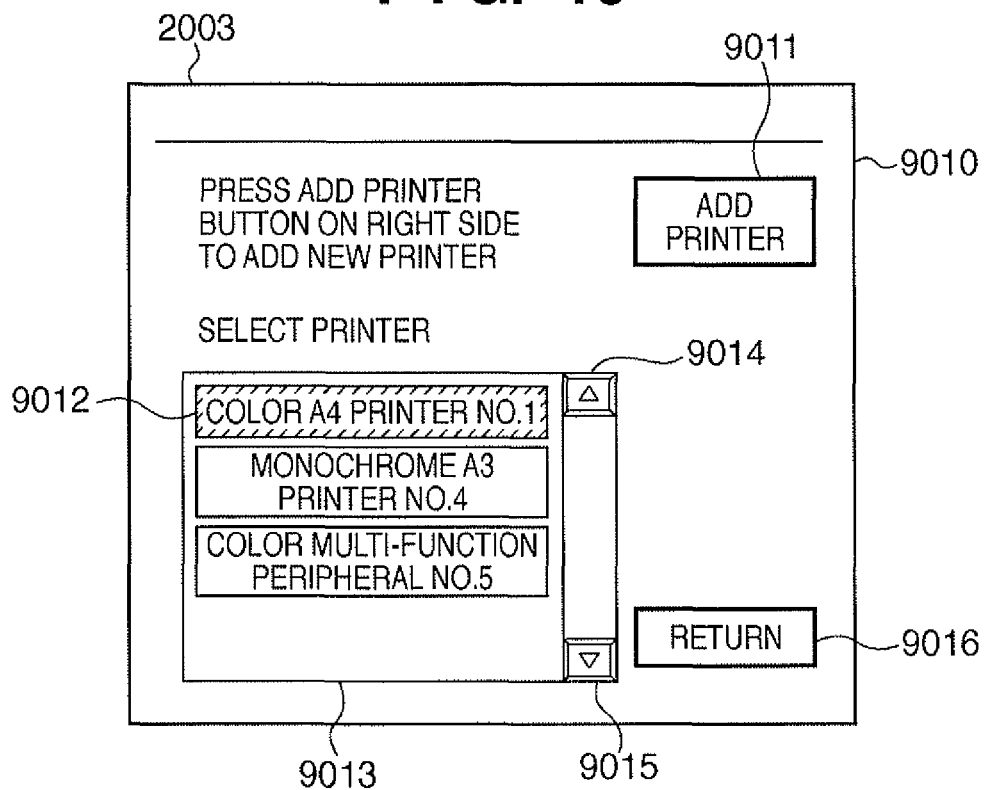
FIG. 10 is a diagram showing an example of a printer selection screen 9010 according to Embodiment 1.

When the printer selection button 9001 is pressed, the CPU 112 displays the printer selection screen 9010 shown in FIG. 10 on the touch panel 2003 of the operation unit 102. FIG. 10 is a diagram showing an example of the printer selection screen 9010 according to Embodiment 1.

Reference numeral 9011 shown in FIG. 10 denotes a printer addition button, and when pressed, a printer addition screen 9020, which will be described later, is displayed on the touch panel 2003 so that a printer selected from among the printers included in the image processing system 100 can be added/input. Reference numeral 9012 denotes a printer selection button for selecting a printer used for printing, in which the printer name acquired from a printer is displayed, and the printer is selected by pressing the button. Reference numeral 9013 denotes an area in which printer selection buttons are displayed. Reference numerals 9014 and 9015 are keys for scrolling the screen, and these keys are effective when a list of printers that can be selected does not fit into the screen. Reference numeral 9016 denotes a return button, which when pressed, displays the selection screen 9000 on the touch panel 2003.

Figure 11:
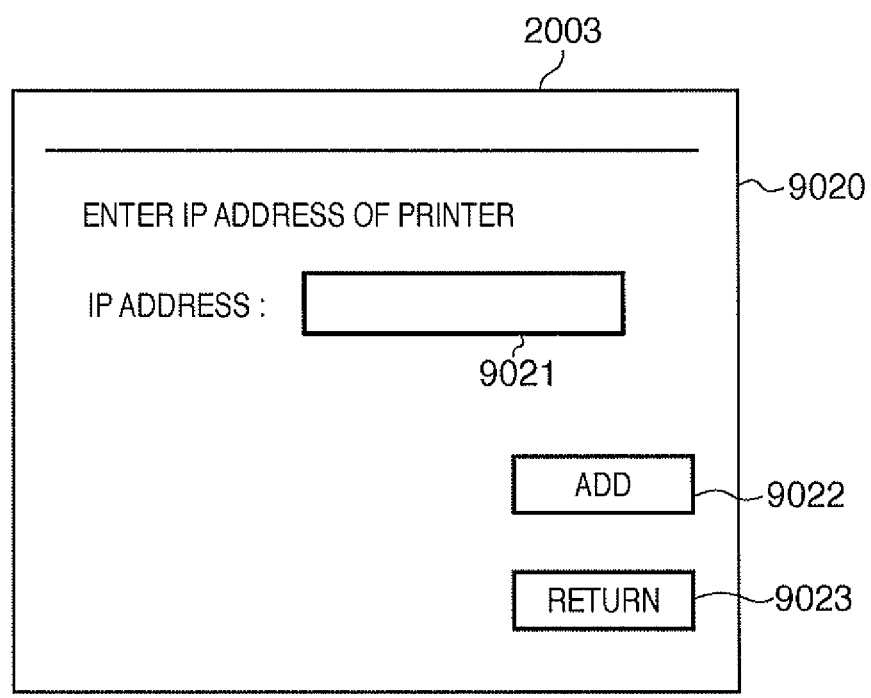
FIG. 11 is a diagram showing an example of a printer addition screen according to Embodiment 1.

FIG. 11 is a diagram showing an example of a printer addition screen according to Embodiment 1. Reference numeral 9021 denotes an IP address input box, and when pressed, the input window 2101 shown in FIG. 5 is displayed on the touch panel 2003. A character string that was input into the input window 2101 is displayed in the IP address input box 9021. When an add button 9022 is pressed, a printer name is acquired from the printer that has the input IP address, and the selection screen 9010 to which a printer selection button 9012 has been added is displayed. When a button 9023 is pressed, the selection screen 9010 is displayed without adding a printer selection button 9012.

Returning to the description of the flowchart of FIG. 8, when a printer is selected in step S802 in the manner described above, the process then advances to step S803. In step S803, when the CPU 112 detects that the start key 2002 has been pressed, the CPU 112 advances the process to step S804.

In step S804, the CPU 112 determines whether or not the printer selected in step S802 has a count function (the count unit 109 and the count storage unit 110). Specifically, the CPU 112 acquires information for identifying whether or not the printer has the count function (fee-charging function) from the printer. If the printer has the count function, the process advances to S806. If the printer does not have the function, the process advances to step S805.

In step S805, the CPU 112 searches the print job numbers 7002 of the provisional count table 7001 for a print job number in which no information is written for the number of pages 7003 and the ID 7004, and adds the ID authenticated in step S801 to the ID 7004, and then, the process advances to step S806. That is, in this step, when the image processing apparatus selected to execute image processing does not have a count function, instead of the image processing apparatus, the multi-function peripheral 101 secures a provisional area for storing the amount scheduled to be formed.

In step S806, the CPU 112 causes the reader unit 105 to read out all original images, and the process advances to step S807. Subsequently, in step S807, the CPU 112 generates a print job that is to be transmitted to the selected printer. Specifically, the CPU 112 first calculates the number of pages to be printed (a third printing amount) based on the number of pages and print settings of the image data.

Next, the CPU 112 generates a print job that includes the number of pages to be printed, the read-out image data, the print settings input into the print settings input area 9003, the print job numbers 7002 to which the ID was added in step S805, and the IP address of the multi-function peripheral 101. Then, the process advances to step 808.

In step S808, the CPU 112 determines whether or not the printer selected in step S802 as a transmission destination has a count function based on the information regarding the count function acquired in step S804. If the printer has a count function, the process advances to step S811. If the printer does not have a count function, the process advances to step S809.

In step S809, the CPU 112 determines whether or not to permit printing (whether or not to transmit the print job). That is, the CPU 112 adds up the number of print pages of the print job that is going to be transmitted, the number of printed pages 6004 that has already been printed with the authenticated ID, and the number of pages 7003 that are scheduled to be printed by all print jobs having the authenticated ID that have already been transmitted to another printer but have not yet been executed. Then, the CPU 112 determines whether or not the cumulative total exceeds the number of printable pages 6003 of the ID authenticated in step S801. If the total does not exceed the number of printable pages 6003, the process advances to step S810. If the total exceeds the number of printable pages 6003, the process advances to step S812.

In step S810, the CPU 112 writes the number of pages to be printed that was calculated in step S807 into the area of the number of pages 7003 of the provisional counter secured in step S805, and the process advances to step S811. At this time, if a plurality of print job records that have the same ID are found in the table shown in FIG. 7, the number of pages of each of such print jobs is added up and managed. Here, the addition may be performed through a process for actually integrating the records, or by just managing the records such that they can be added up when the determination of step S809 is performed the next time. In step S811, the CPU 112 transmits the print job generated in step S807 to the printer selected in step S802.

If, on the other hand, it is determined to not permit printing in step S809, in step S812, the CPU 112 deletes the information on the ID 7004 of the provisional counter secured in step S805.

Control while Waiting for Print Job to End

Figure 12:
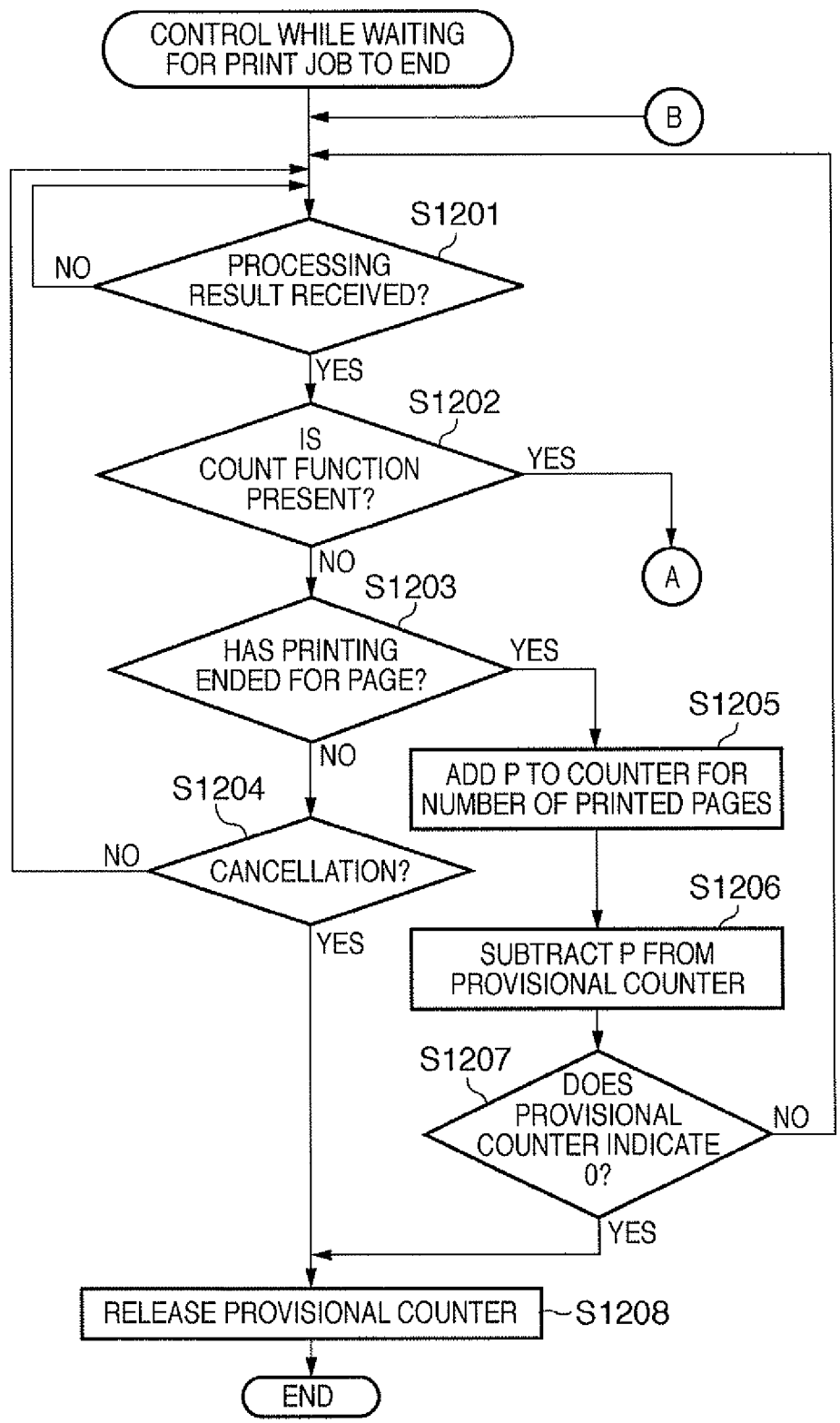
FIG. 12 is a flowchart illustrating a processing procedure for performing control while waiting for a print job to end by a multi-function peripheral according to Embodiment 1.
Figure 13:
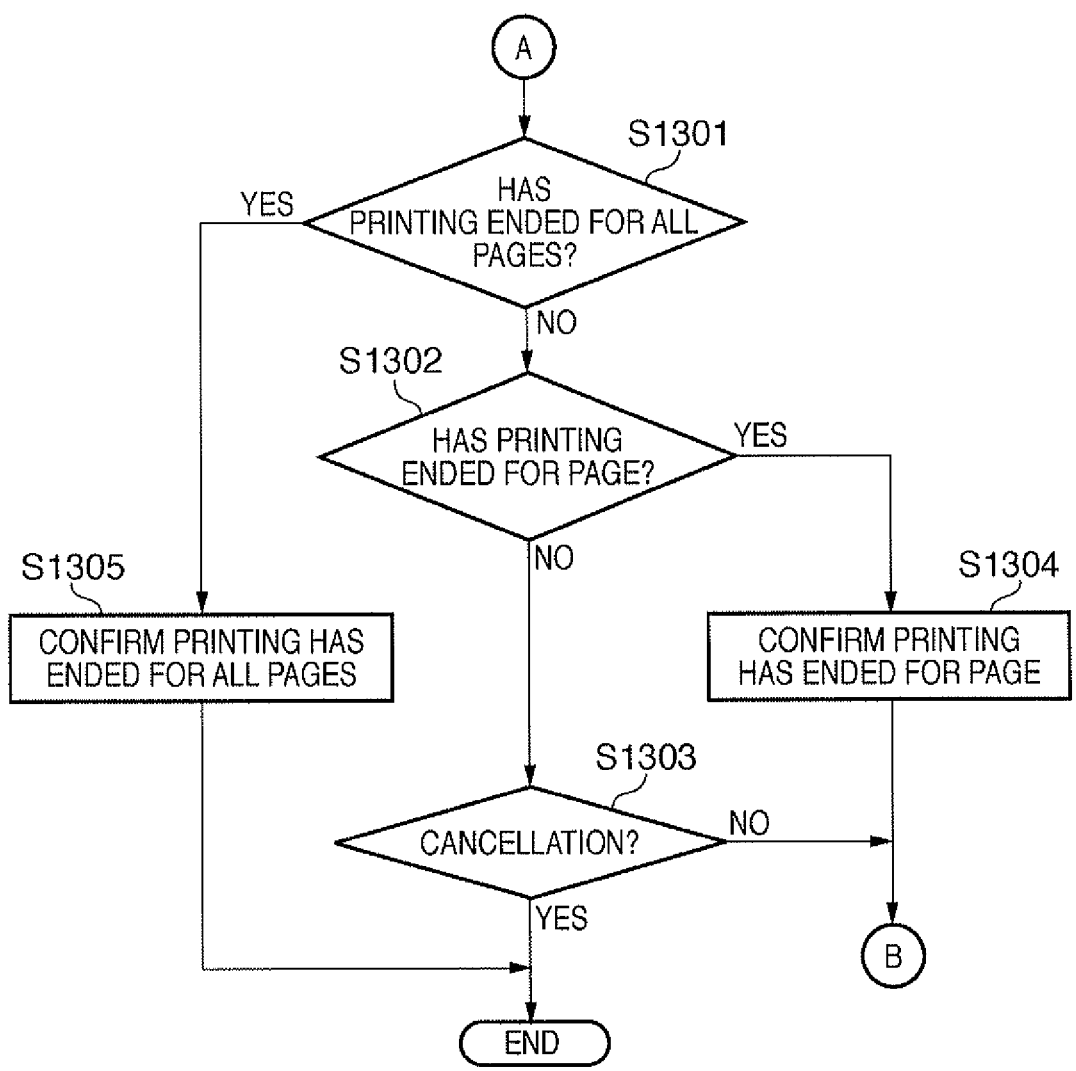
FIG. 13 is a flowchart illustrating a processing procedure for performing control while waiting for a print job to end by a multi-function peripheral according to Embodiment 1.

Next, control while waiting for a print job to end that is performed after a print job has been transmitted will be described with reference to FIGS. 12 and 13. FIGS. 12 and 13 are flowcharts illustrating a processing procedure for performing control while waiting for a print job to end by the multi-function peripheral according to Embodiment 1. The process described below is collectively controlled by the CPU 112 of the multi-function peripheral 101.

In step S1201, the CPU 112 determines whether or not it has received information regarding the result of processing from the printer 201 or 301 via the interface unit 104. If the CPU 112 has not received such information, it repeats the determination of S1201 at a regular interval. If, on the other hand, the CPU 112 has received such information, the process advances to step S1202.

In step S1202, the CPU 112 determines whether or not the printer has a count function from the processing result information received in step S1201. If the printer has a count function, the process advances to step S1301 shown in FIG. 13. If the printer does not have a count function, the process advances to step S1203.

In step S1203, the CPU 112 determines whether or not the acquired processing result information indicates that printing has ended for a page. If the processing result information indicates that printing has ended for a page, it is determined that the print job has been executed properly, and the process advances to step S1205. If, on the other hand, the processing result information does not indicate that printing has ended for a page, the process advances to step S1204.

In step S1204, the CPU 112 determines whether or not the processing result information indicates cancellation (an interruption notification). If the processing result information indicates cancellation, the process advances to step S1208. If the processing result information does not indicate cancellation, the process returns to step S1201. The interruption notification is provided, for example, when the image processing apparatus is turned on after having been turned off during the execution of image processing, or when image processing cannot be continued due to an error.

In step S1205, the CPU 112 acquires the ID information and the number of completed pages P from the processing result information. Next, the CPU 112 searches the IDs 6002 of the page count table for each ID 6001 for the ID indicated by the acquired ID information, adds the number of completed pages P to the number of printed pages 6004 of the corresponding ID, and the process advances to step S1206.

In step S1206, the CPU 112 acquires the print job number and the number of completed pages P from the acquired processing result information. Next, the CPU 112 searches the print job numbers 7002 of the provisional count table 7001 for the acquired print job number, subtracts the number of completed pages P from the number of pages to be printed 7003 of the corresponding print job number, and the process advances to step S1207. As described above, when the image processing apparatus that executes printing does not have a count function, in steps S1205 and S1206, the CPU 112 updates the number of pages to be printed 7003 in addition to the number of printed pages 6004.

In step S1207, the CPU 112 determines whether or not the number of pages to be printed 7003 after the subtraction of step S1206 is 0. If the number of pages to be printed 7003 is 0, the process advances to step S1208. If the number of pages to be printed 7003 is a value other than 0, the process returns to step S1201.

In step S1208, the CPU 112 acquires the print job number from the acquired processing result information, searches the print job numbers 7002 of the provisional count table 7001 for the acquired print job number, and deletes the content written in the ID 7004 and the number of pages to be printed 7003 of the corresponding print job number. That is, in this step, the provisional area secured in step S805 is released.

Next, the process performed when it has been determined in step S1202 that the printer that has transmitted the processing result has a count function will be described. In step S1301, the CPU 112 determines whether or not the acquired processing result information indicates that printing has ended for all pages. If the acquired processing result information does not indicate that printing has ended for all pages, the process advances to step S1302. If, on the other hand, the acquired processing result information indicates that printing has ended for all pages, the process advances to step S1305.

In step S1302, the CPU 112 determines whether or not the acquired processing result information indicates that printing has ended for a page. If the acquired processing result information indicates that printing has ended for a page, it is determined that the print job has been executed properly, and the process advances to step S1304. If, on the other hand, the acquired processing result information does not indicate that printing has ended for a page, the process advances to step S1303.

In step S1303, the CPU 112 determines whether or not the acquired processing result information indicates cancellation. If the acquired processing result information indicates cancellation, the process ends. If, on the other hand, the acquired processing result information does not indicate cancellation, the process returns to step S1201.

In step S1304, the CPU 112 confirms that printing has ended for one page, and the process returns to step S1201. In step S1305, the CPU 112 confirms that printing has ended for all pages, and the process ends.

As described above, when the printer as a transmission destination of the print job has a count function, because the printer as a transmission destination manages the number of printed pages, the multi-function peripheral 101 as a transmission source needs only to confirm the status of the print job that the multi-function peripheral 101 has transmitted.

Print Job Execution Control

Figure 14:
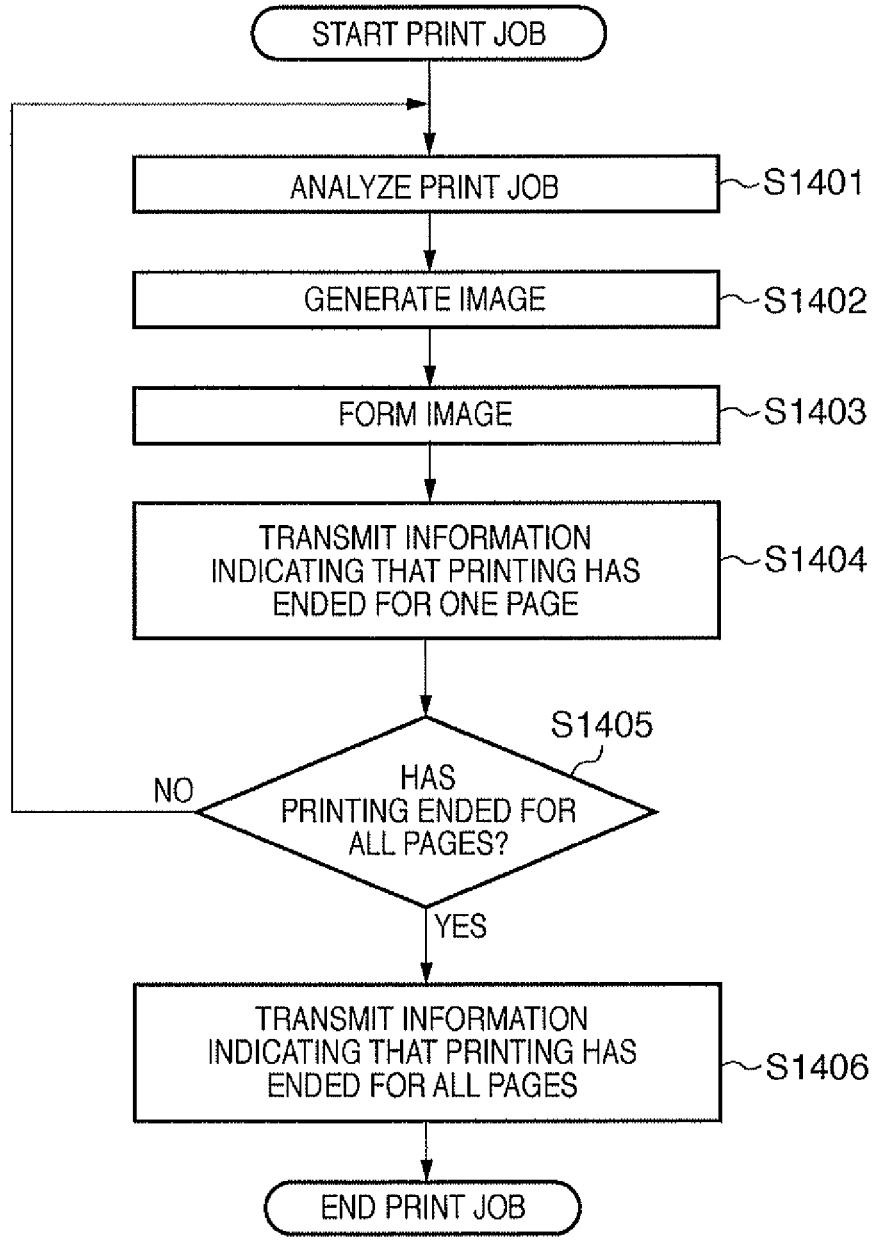
FIG. 14 is a flowchart illustrating a processing procedure for executing a print job performed by a printer according to Embodiment 1.

Next, print job execution control performed by the printer 201 that has received the print job from the multi-function peripheral 101 will be described with reference to FIG. 14. FIG. 14 is a flowchart illustrating a processing procedure for executing a print job with the printer according to Embodiment 1. The process described below is collectively controlled by the CPU 206 of the printer 201. Here, it is assumed as an example that the printer 201 is used as a printer that executes a print job, but control is performed in the same manner even when another printer is used.

When the CPU 206 receives a print job via the interface unit 204, in step S1401, the CPU 206 analyzes one printed page's worth of the print job. Subsequently, in step S1402, the CPU 206 generates image data for the one printed page's worth of the print job analyzed in step S1401. Furthermore, in step S1403, based on the one printed page's worth of the image data generated in step S1402, the image is printed onto a recording material, and the process advances to step S1404.

In step S1404, the CPU 206 creates processing result information that includes information that indicates that printing has ended for a page, the print job number, and the number of completed pages (one page), and transmits the processing result information to the IP address included in the print job information. In this example, the processing result information is transmitted to the multi-function peripheral 101.

Next, in step S1405, the CPU 206 determines whether or not printing has ended for all pages. If printing has not ended for all pages, the process returns to step S1401. If printing has ended for all pages, the process advances to step S1406. In step S1406, the CPU 206 generates processing result information that includes information that indicates that printing has ended for all pages and the print job number, and transmits the processing result information to the IP address included in the print job information.

As described thus far, in the image processing system of the present embodiment, for example, when executing a plurality of remote processes (such as printing) simultaneously using a plurality of image processing apparatuses, job execution (transmission) is permitted taking information on all jobs related to a user account into consideration. Specifically, control is performed such that the total of the number of already printed pages using the user account, the number of pages of a job that is going to be transmitted, and the number of pages of another job that is currently being executed within the image processing system using the same account does not exceed the upper limit amount. With this configuration, even when a plurality of image processing apparatuses execute jobs that are related to the same account, the printing amount of all of the already executed jobs and the printing amount of jobs that are going to be executed are considered before execution of the jobs, and as a result, it is possible to execute the jobs within the usage limit. Also, in this image processing system, the image processing apparatus that executes a job transmits an end notification that indicates that printing has ended to the image processing apparatus that has requested the job each time printing has ended for one page. With this configuration, real time counting becomes possible, so even when a job is cancelled during execution of the job, for example, it is possible to accurately count the number of printed pages.

In addition, in the multi-function peripheral 101 of the present embodiment, whether or not to permit printing is determined after the generation of a print job containing all the pages thereof, and if printing is not permitted, the transmission of the print job is stopped. However, it is also possible to generate and print a print job in which the number of pages has been changed to an allowable number, for example. That is, in the generated print job, a print job amount may be transmitted such that the total of the printing amounts of all print jobs related to the user account does not exceed the upper limit amount.

Furthermore, in the multi-function peripheral 101 of the present embodiment, a print job that contains all the pages thereof is generated and transmitted to the printer 201 or 301, but it is also possible to employ a configuration in which such a print job is divided into print jobs that each contain one page, and whether or not to permit printing is determined for each divided print job.

Embodiment 2

Figure 16:
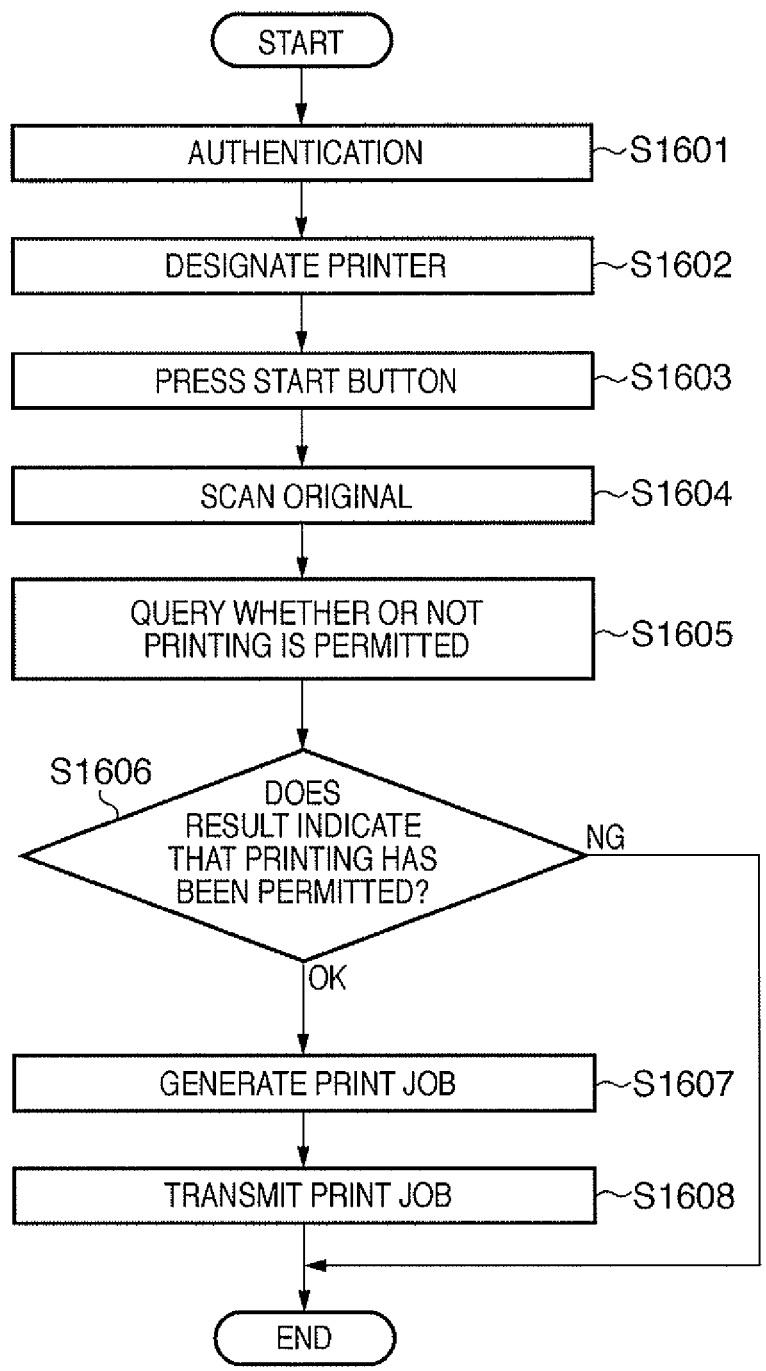
FIG. 16 is a flowchart illustrating a processing procedure for transmitting a print job performed by a multi-function peripheral according to Embodiment 2.
Figure 17:
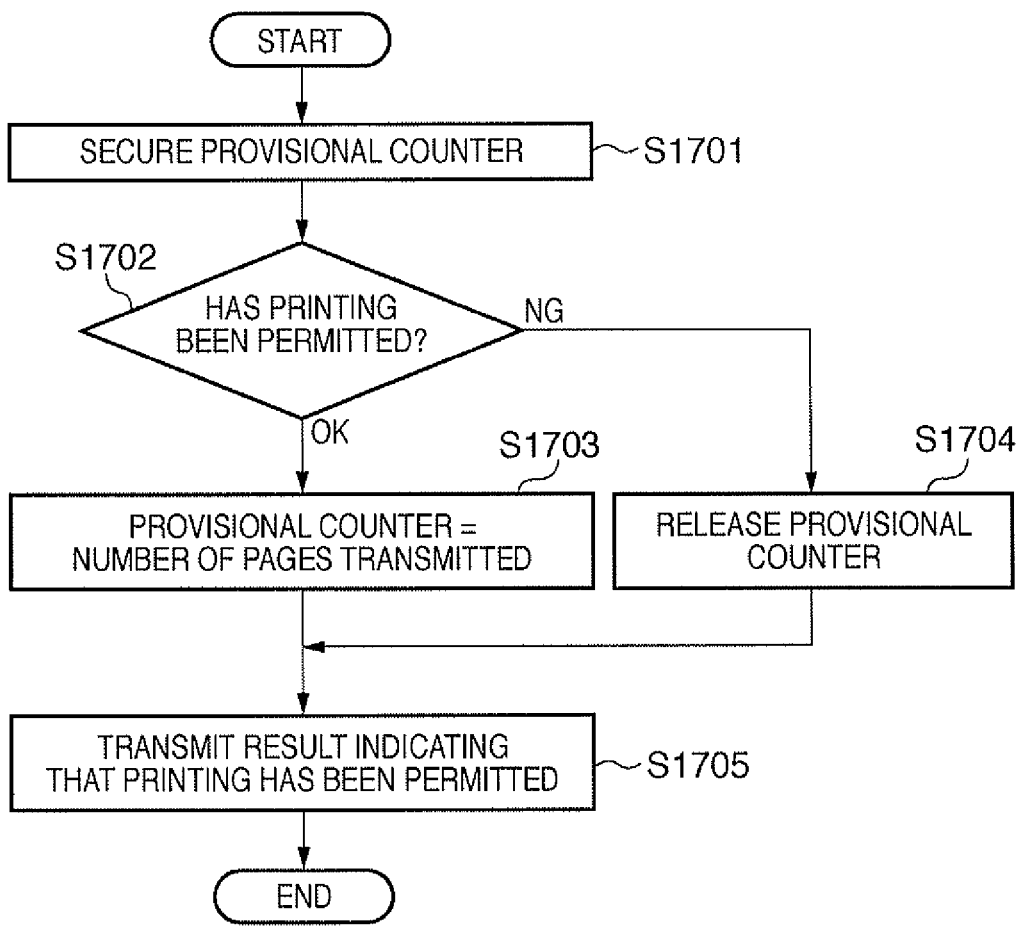
FIG. 17 is a flowchart illustrating a procedure of a print job process performed by a management server according to Embodiment 2.

Embodiment 2 will be described next with reference to FIGS. 15 to 17. In the above embodiment, an image processing system in which the multi-function peripheral 101 has a count function and an authentication function was described. In the present embodiment, an image processing system 1500 in which a management server 401 has the count function and the authentication function will be described. Hereinafter, the same reference numerals are assigned to the same components as those of Embodiment 1, and a description thereof is omitted here.

Figure 15:
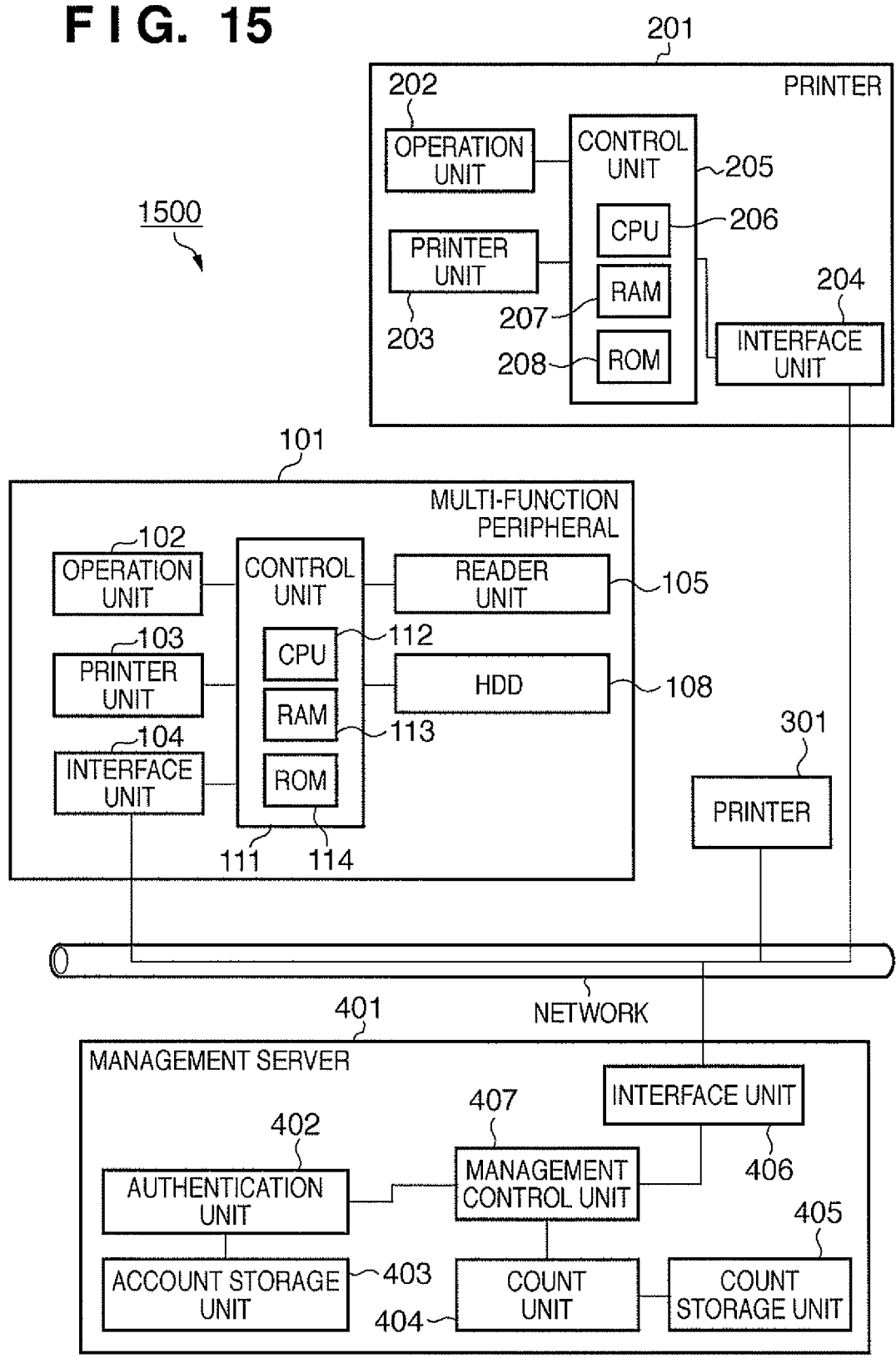
FIG. 15 is a block diagram showing an example of a configuration of an image processing system according to Embodiment 2.

FIG. 15 is a block diagram showing an example of a configuration of an image processing system according to Embodiment 2. As shown in FIG. 15, the image processing system 1500 includes, in addition to a multi-function peripheral 101, and printers 201 and 301, a management server 401. The multi-function peripheral 101 of the present embodiment includes an operation unit 102, a printer unit 103, an interface unit 104, a reader unit 105, a hard disk (HDD) 108 and a multi-function peripheral control unit 111, and generates, transmits and executes print jobs.

The management server 401 includes an authentication unit 402, an account storage unit 403, a count unit 404, a count storage unit 405, an interface unit 406 and a management control unit 407. The management server 401 responds to authentication requests and print permission queries that are sent from the multi-function peripheral 101 and the printers 201 and 301, as well as counts the number of pages of print.

The authentication unit 402 receives an ID and a password from the multi-function peripheral 101 via the interface unit 406 and the management control unit 407, determines whether or not there is a combination of the received ID and password in the account storage unit 403, and outputs the result of determination to the management control unit 407. The account storage unit 403 pre-stores combinations of IDs and passwords determined as available in the image processing system 1500.

The count unit 404 counts the number of printed pages or the like for each account, and stores the result in the count storage unit 405. The interface unit 406 is an interface with the multi-function peripheral 101 and the printers 201 and 301, which transmits and receives information, such as an authentication request, a result of authentication, a determination request and a result of determination, to and from the multi-function peripheral 101 and the printers 201 and 301 via a network.

The management control unit 407 includes a CPU, a ROM, a RAM and so on, and the CPU loads a program stored in the ROM or another storage medium into the RAM, executes the program, and thereby collectively controls the management server 401.

Print Job Transmission Control

Next, print job transmission control according to the present embodiment will be described with reference to FIG. 16. FIG. 16 is a flowchart illustrating a processing procedure for transmitting a print job performed by the multi-function peripheral according to Embodiment 2. The process described below is collectively controlled by the CPU 112.

When the ID key 2004 is pressed by the user, in step S1601, the CPU 112 displays the authentication screen 4000 shown in FIG. 4 on the touch panel 2003 of the operation unit 102. Furthermore, when an ID and a password are input, and then, the OK key 4003 is pressed by the user, the CPU 112 transmits the ID and the password to the management server 401 that is an information processing apparatus via the interface unit 104 to request authentication. If the result of authentication received afterwards indicates that authentication was successful, the process advances to step S1602.

In step S1602, the CPU 112 displays the above-described selection screens 9000 and 9010 and the addition screen 9020 on the touch panel 2003 to prompt the user to select the printer 201 or 301 to execute the print job. When a printer has been selected and the start key 2002 has been pressed, the process advances to step S1604.

In step S1604, the CPU 112 reads out all original images with the reader unit 105, and the process advances to step S1605. In step S1605, the CPU 112 requests the management server 401 to determine whether or not to transmit the job. Specifically, the CPU 112 transmits, to the management server 401, print permission query information that includes the IP address of the multi-function peripheral 101, the number of pages of image data, the number of pages to be printed calculated based on the print settings and the ID authenticated in S1601.

Next, in step S1606, when the CPU 112 receives print permission information regarding whether or not to permit printing from the management server 401, the CPU 112 determines whether or not the print permission information indicates that printing (transmission of the print job) has been permitted. If printing has been permitted, the process advances to step S1607. If printing has not been permitted, the process ends.

In step S1607, the CPU 112 calculates the number of pages to be printed based on the number of pages of image data and the print settings. The CPU 112 also acquires the print job number 7002 from the print permission information received in step S1606. Furthermore, the CPU 112 generates a print job that includes the number of pages to be printed, the print job number 7002, the image data read out in step S1604, the print settings input in the print settings input area 9003, and the IP address of the management server 401. After that, in step S1608, the CPU 112 transmits the print job generated in step S1607 to the printer selected in step S1602.

Control of Management Server

Next, a process procedure of the management server 401 of the present embodiment will be described with reference to FIG. 17. FIG. 17 is a flowchart illustrating a procedure of a print job process performed by the management server according to Embodiment 2. The process described below is collectively controlled by the management control unit 407.

When the management control unit 407 receives print permission query information from the multi-function peripheral 101 or the printer 201 or 301, in step S1701, the management control unit 407 searches the print job numbers 7002 of the provisional count table 7001 for a print job number in which no information is written for the number of pages 7003 and the ID 7004, and secures it. Furthermore, the management control unit 407 adds the ID acquired from the print permission query information to the ID 7004, and the process advances to step S1702.

In step S1702, the management control unit 407 determines whether or not to permit printing (transmission of the print job) in response to the print permission query. That is, the number of pages to be printed acquired from the print permission query information, the number of printed pages 6004 of the authenticated ID, and the number of pages 7003 that are scheduled to be printed by all print jobs having the authenticated ID that have already been transmitted but have not yet been executed are added up. Next, the management control unit 407 determines whether or not to permit printing by determining whether or not the cumulative total exceeds the number of printable pages 6003 of the ID acquired from the print permission query information. If the total does not exceed the number of printable pages 6003, the process advances to step S1703. If the total exceeds the number of printable pages 6003, the process advances to step S1704.

If the management control unit 407 determines that printing is permitted, in step S1703, the management control unit 407 writes the number of pages to be printed acquired from the print permission query information into the area of the number of pages 7003 secured in step S1701, and the process advances to step S1705.

If, on the other hand, the management control unit 407 determines that printing is not permitted, in step S1704, the management control unit 407 deletes the ID 7004 of the provisional counter secured in step S1701, and the process advances to step S1705.

In step S1705, the management control unit 407 transmits the result of determination made in step S1702 to the IP address included in the print permission query information. Furthermore, the management control unit 407, in the case of permitting printing, transmits print permission information that includes the print job number 7002 of the provisional counter secured in step S1701 to the IP address.

The control while waiting for a print job to end executed by the management control unit 407 in the present embodiment is the same as that described using the flowcharts of FIGS. 12 and 13, so a description thereof is omitted here. Likewise, the print job execution control performed by the printer 201 in the present embodiment is the same as that described using the flowchart of FIG. 14, so a description thereof is omitted here.

As described thus far, in the image processing system of the present embodiment, by providing a count function to a management server that is an information processing apparatus, the same effects as those of Embodiment 1 can be produced. Also, by providing such a management function that manages a usage limit to an apparatus that is different from the image processing apparatus, it is possible to reduce the processing load of the image processing apparatus.

Embodiment 3

Figure 19:
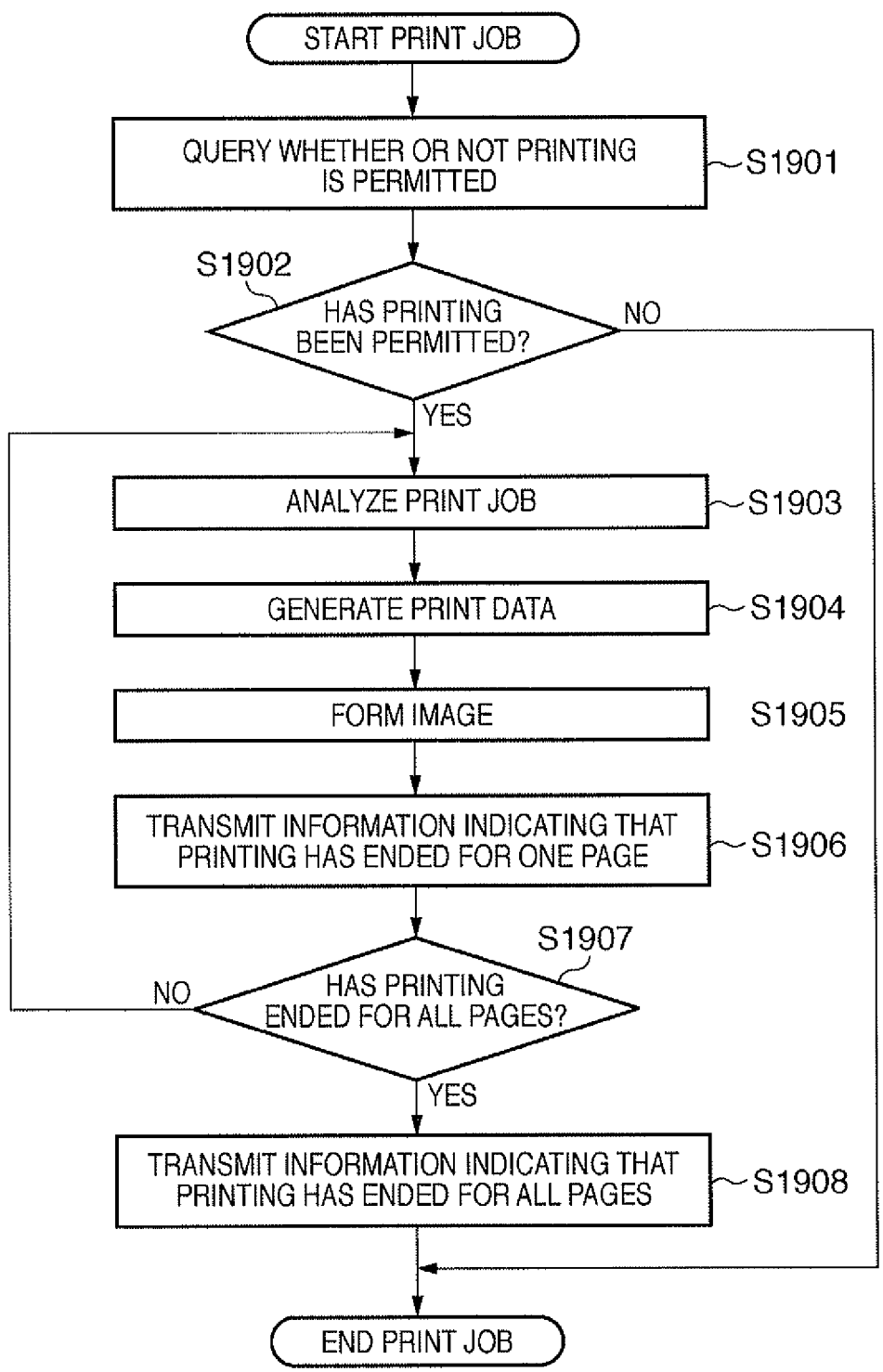
FIG. 19 is a flowchart illustrating a processing procedure for executing a print job performed by a printer according to Embodiment 3.

Next, Embodiment 3 will be described with reference to FIGS. 18 and 19. In Embodiment 2, an example was described in which the multi-function peripheral 101 sends a print permission query to the management server 401, but in the present embodiment, an example in which the printer 201 or 301 sends a print permission query will be described. That is, in the present embodiment, the printer 201 or 301 that executes a print job sends a print permission query to the management server 401.

Print Job Transmission Control

First, print job transmission control according to the present embodiment will be described with reference to FIG. 18. FIG. 18 is a flowchart illustrating a processing procedure for transmitting a print job performed by a multi-function peripheral according to Embodiment 3. The process described below is collectively controlled by the CPU 112.

When the ID key 2004 is pressed by the user, in step S1801, the CPU 112 displays the authentication screen 4000 shown in FIG. 4 on the touch panel 2003 of the operation unit 102. Furthermore, when information is input into the ID input box 4001 and the password input box 4002 by the user, and then, the OK key 4003 is pressed, the CPU 112 transmits the ID and the password to the management server 401 via the interface unit 104, and receives the result of authentication. If authentication is successful, the process advances to step S1802.

In step S1802, the CPU 112 displays the above-described selection screens 9000 and 9010 and the addition screen 9020 on the touch panel 2003 to prompt the user to select the printer 201 or 301 to execute the print job. When a printer has been selected and the start key 2002 has been pressed, the process advances to step S1804.

In step S1804, the CPU 112 reads out all original images with the reader unit 105, and the process advances to step S1805. In step S1805, the CPU 112 calculates the number of pages to be printed based on the number of pages of image data and the print settings. Furthermore, the CPU 112 generates a print job that includes the number of pages to be printed, the image data read out in step S1804, the print settings input into the print settings input area 9003, and the ID authenticated in step S1801, and the process advances to step S1806.

In step S1806, the CPU 112 transmits the print job generated in step S1805 to the printer selected in step S1802.

Print Job Execution Control

Next, print job execution control performed by the printer 201 that has received the print job from the multi-function peripheral 101 of the present embodiment will be described with reference to FIG. 19. FIG. 19 is a flowchart illustrating a processing procedure for executing a print job by a printer according to Embodiment 3. The process described below is collectively controlled by the CPU 206 of the printer 201. Here, it is assumed as an example that the printer 201 is used as a printer that executes a print job, but control is performed in the same manner eve when another printer is used.

When the CPU 206 receives a print job via the interface unit 204, in step S1901, the CPU 206 transmits, to the management server 401, the IP address of the printer 201, the number of pages to be printed acquired from the print job, and the print permission query information. The query information includes the authenticated ID.

In step S1902, the CPU 206 determines whether or not printing has been permitted by referring to the print permission information that indicates whether or not to execute the print job and that has been received from the management server 401. If printing has been permitted, the process advances to step S1903. If printing has not been permitted, the process ends.

In step S1903, the CPU 206 analyzes one printed page's worth of the print job. Subsequently, in step S1904, the CPU 206 generates image data for the one printed page's worth of the print job analyzed in step S1903. Furthermore, in step S1905, based on the one printed page's worth of the image data generated in step S1904, the CPU 206 prints the image onto a recording material, and the process advances to step S1906.

In step S1906, the CPU 206 creates processing result information that includes information that indicates that printing has ended for a page, the print job number acquired from the print permission information, and the number of completed pages (one page), and transmits the processing result information to the management server. Subsequently, in step S1907, the CPU 206 determines whether or not printing has ended for all pages. If printing has ended for all pages, the process advances to step S1903. If printing has not ended for all pages, the process advances to step S1908.

In step S1908, the CPU 206 creates processing result information that includes information that indicates that printing has ended for all pages, and the print job number acquired from the print permission information, and transmits the processing result information to the management server 401.

The control while waiting for a print job to end executed by the management control unit 407 in the present embodiment is the same as that described using the flowcharts of FIGS. 12 and 13, so a description thereof is omitted here.

As described thus far, in the image processing system of the present embodiment, by providing a count function to a management server that is an information processing apparatus, the same effects as those of Embodiment 1 can be produced. Also, by providing such a management function that manages a usage limit to an apparatus that is different from the image processing apparatus, it is possible to reduce the processing load of the image processing apparatus.

In Embodiments 1 to 3 given above, an example was described in which the count tables of FIGS. 6 and 7 are managed in association with user IDs, and whether or not to permit the execution (transmission) of a print job is determined for each user ID, but it is also possible to implement a configuration that does not use user IDs. Specifically, a configuration can be employed in which an image processing apparatus collectively counts all print jobs executed (transmitted) by the image processing apparatus, and determines whether or not to permit execution (transmission) by comparing the result with the upper limit amount set in the image processing apparatus itself. Also, in the case of using IDs, the IDs used are not necessary user IDs, and various IDs can be used such as department IDs or group IDs.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-256637 filed on Oct. 1, 2008, which is hereby incorporated by reference herein in its entirety.

What is claimed is:

1. An image processing system comprising: a first image processing apparatus that transmits an image processing job, and a second image processing apparatus that receives the image processing job, transmitted by the first image processing apparatus and executes the received image processing job, the first image processing apparatus comprising:
a generation unit that generates an image processing job to be transmitted to the second image processing apparatus,
a management unit that manages a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus,
a determination unit that, before the image processing job generated by the generation unit is transmitted to the second image processing apparatus, determines whether or not a total of a third printing amount that is scheduled to be printed by the generated image processing job, the first printing amount and the second printing amount exceeds a predetermined upper limit amount,
a transmission unit that, when the total has been determined to not exceed the upper limit amount as a result of determination by the determination unit, transmits the generated image processing job to the second image processing apparatus,
an adding unit that adds, in a case where the transmission unit transmits the generated image processing job, the third printing amount to the second printing amount to obtain a new second printing amount, and causes the management unit to manage the new second printing amount, and
an update unit that, when a result of execution by the second image processing apparatus of the image processing job transmitted by the transmission unit is sent from the second image processing apparatus, updates the first printing amount and the new second printing amount, and
the second image processing apparatus comprising:
a receiving unit that receives the image processing job from the first image processing apparatus,
a processing unit that executes the image processing job received by the receiving unit, and a notification unit that notifies the first image processing apparatus of a result of execution of the image processing job executed by the processing unit, wherein, when a result that indicates that the image processing job transmitted by the transmission unit has not been executed properly by the second image processing apparatus is sent, the update unit subtracts the third printing amount from the new second printing amount to obtain the original second printing amount, without updating the first printing amount.

2. The image processing system according to claim 1, wherein the management unit manages the first printing amount and the second printing amount in association with a user ID, and the determination unit determines whether or not the total of the third printing amount, and the first printing amount and the second printing amount that correspond to a user ID of the generated image processing job exceeds a predetermined upper limit amount for the user ID of the generated image processing job.

3. The image processing system according to claim 1, wherein the first image processing apparatus further comprises a selection unit that selects an image processing apparatus that serves as a transmission destination of the image processing job generated by the generation unit from among a plurality of image processing apparatuses within the image processing system in accordance with an instruction input through a selection screen displayed on a display.

4. The image processing system according to claim 3, further comprising a judging unit that judges whether or not the image processing apparatus selected by the selection unit has a unit that manages a printing amount that has already been printed by an image processing job executed within the image processing system, wherein, when the judging unit has judged that the image processing apparatus selected by the selection unit has a unit that manages a printing amount that has already been printed by an image processing job executed within the image processing system, the transmission unit transmits the generated image processing job to the selected image processing apparatus, without performing the determination by the determination unit.

5. The image processing system according to claim 1, wherein, when a result that indicates that the image processing job transmitted by the transmission unit has been executed properly by the second image processing apparatus is sent, the update unit adds the third printing amount to the first printing amount to obtain a new first printing amount, and subtracts the third printing amount from the new second printing amount to obtain the original second printing amount.

6. The image processing system according to claim 1, wherein when the total has been determined to exceed the upper limit amount as a result of the determination by the determination unit, the transmission unit transmits, to the second image processing apparatus, the image processing job generated by the generation unit in an amount of range that the total does not exceed the upper limit amount.

7. An image processing system comprising: a first image processing apparatus that transmits an image processing job, a second image processing apparatus that receives the image processing job transmitted by the first image processing apparatus and executes the received image processing job, and an information processing apparatus, the first image processing apparatus comprising:

a generation unit that generates an image processing job to be transmitted to the second image processing apparatus, a query unit that, before the image processing job generated by the generation unit is transmitted to the second image processing apparatus, notifies the information processing apparatus of a third printing amount that is scheduled to be printed by the generated image processing job and queries whether or not the generated image processing job can be transmitted, and a transmission unit that, when a response that indicates that the generated image processing job can be transmitted is sent from the information processing apparatus as a result of the query by the query unit, transmits the generated image processing job to the second image processing apparatus, the second image processing apparatus comprising:

a receiving unit that receives the image processing job from the first image processing apparatus, a processing unit that executes the image processing job received by the receiving unit, and a notification unit that notifies the information processing apparatus of a result of execution of the image processing job executed by the processing unit, and the information processing apparatus comprising:

a management unit that manages a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus, a determination unit that, in response to the query from the first image processing apparatus, determines whether or not a total of the third printing amount that is scheduled to be printed by the generated image processing job, the first printing amount and the second printing amount exceeds a predetermined upper limit, a response unit that provides a response that indicates whether or not to permit transmission of the generated image processing job to the first image processing apparatus based on a result of determination by the determination unit, and an update unit that, when a result of execution by the second image processing apparatus of the image processing job transmitted by the first image processing apparatus is sent from the second image processing apparatus, updates the first printing amount and a new second printing amount;

wherein, when a result that indicates that the image processing job transmitted by the transmission unit has not been executed properly by the second image processing apparatus is sent, the update unit subtracts the third printing amount from the new second printing amount to obtain the original second printing amount, without updating the first printing amount.

8. An image processing system comprising: a first image processing apparatus that transmits an image processing job, a second image processing apparatus that receives the image processing job transmitted by the first image processing apparatus and executes the received image processing job, and an information processing apparatus, the first image processing apparatus comprising:

a generation unit that generates an image processing job to be transmitted to the second image processing apparatus, and a transmission unit that transmits the image processing job generated by the generation unit to the second image processing apparatus, the second image processing apparatus including:

a receiving unit that receives the image processing job from the first image processing apparatus, a query unit that, before the received image processing job is executed, notifies the information processing apparatus of a third printing amount that is scheduled to be printed by the received image processing job and queries whether or not the received image processing job can be executed, a processing unit that, when a response that indicates that the received image processing job can be executed is sent from the information processing apparatus as a result of the query by the query unit, executes the received image processing job, and a notification unit that notifies the information processing apparatus of a result of execution of the image processing job executed by the processing unit, and the information processing apparatus comprising:

a management unit that manages a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus, a determination unit that, in response to the query from the second image processing apparatus, determines whether or not a total of the third printing amount that is scheduled to be printed by the received image processing job, the first printing amount and the second printing amount exceeds a predetermined upper limit, a response unit that provides a response that indicates whether or not to permit execution of the received image processing job to the second image processing apparatus based on a result of determination by the determination unit, and an update unit that, when a result of execution by the second image processing apparatus of the image processing job transmitted by the first image processing apparatus is sent from the second image processing apparatus, updates the first printing amount and a new second printing amount;

wherein, when a result that indicates that the image processing job transmitted by the transmission unit has not been executed properly by the second image processing apparatus is sent, the update unit subtracts the third printing amount from the new second printing amount to obtain the original second printing amount, without updating the first printing amount.

9. A method for controlling an image processing system comprising a first image processing apparatus that transmits an image processing job, and a second image processing apparatus that receives the image processing job transmitted by the first image processing apparatus and executes the received image processing job, the method comprising:

by the first image processing apparatus, generating an image processing job to be transmitted to the second image processing apparatus;

managing a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus;

determining whether or not a total of a third printing amount that is scheduled to be printed by the generated image processing job, the first printing amount and the second printing amount exceeds a predetermined upper limit amount before the image processing job generated in the generation step is transmitted to the second image processing apparatus;

transmitting the generated image processing job to the second image processing apparatus when the total has been determined to not exceed the upper limit amount as a result of determination in the determination step;

adding, in a case where the generated image processing job is transmitted in the transmitting step, the third printing amount to the second printing amount to obtain a new second printing amount, and causing the management step to manage the new second printing amount, and updating the first printing amount and the new second printing amount when a result of execution by the second image processing apparatus of the image processing job transmitted in the transmission step is sent from the second image processing apparatus; and by the second image processing apparatus, receiving the image processing job from the first image processing apparatus;

executing the image processing job received in the receiving step; and notifying the first image processing apparatus of a result of execution of the image processing job executed in the executing step, wherein, when a result that indicates that the transmitted image processing job has not been executed properly by the second image processing apparatus is sent, the third printing amount is subtracted from the new second printing amount to obtain the original second printing amount, without updating the first printing amount.

10. A method for controlling an image processing system comprising a first image processing apparatus that transmits an image processing job, a second image processing apparatus that receives the image processing job transmitted by the first image processing apparatus and executes the received image processing job, and an information processing apparatus, the method comprising:

by the first image processing apparatus, generating an image processing job to be transmitted to the second image processing apparatus;

notifying the information processing apparatus of a third printing amount that is scheduled to be printed by the generated image processing job and querying whether or not the generated image processing job can be transmitted before the image processing job generated in the generation step is transmitted to the second image processing apparatus; and transmitting the generated image processing job to the second image processing apparatus when a response that indicates that the generated image processing job can be transmitted is sent from the information processing apparatus as a result of the query in the query step;

by the second image processing apparatus, receiving the image processing job from the first image processing apparatus;

executing the image processing job received in the receiving step; and notifying the information processing apparatus of a result of execution of the image processing job executed in the executing step;

by the information processing apparatus, managing a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus;

determining whether or not a total of the third printing amount that is scheduled to be printed by the generated image processing job, the first printing amount and the second printing amount exceeds a predetermined upper limit in response to the query from the first image processing apparatus;

providing a response that indicates whether or not to permit transmission of the generated image processing job to the first image processing apparatus based on a result of determination in the determination step; and updating the first printing amount and a new second printing amount when a result of execution by the second image processing apparatus of the image processing job transmitted by the first image processing apparatus is sent from the second image processing apparatus, wherein, when a result that indicates that the transmitted image processing job has not been executed properly by the second image processing apparatus is sent, the third printing amount is subtracted from the new second printing amount to obtain the original second printing amount, without updating the first printing amount.

11. A method for controlling an image processing system comprising a first image processing apparatus that transmits an image processing job, a second image processing apparatus that receives the image processing job transmitted by the first image processing apparatus and executes the received image processing job, and an information processing apparatus, the method comprising:

by the first image processing apparatus, generating an image processing job to be transmitted to the second image processing apparatus; and transmitting the image processing job generated in the generation step to the second image processing apparatus;

by the second image processing apparatus, receiving the image processing job from the first image processing apparatus;

notifying the information processing apparatus of a third printing amount that is scheduled to be printed by the received image processing job and querying whether or not the received image processing job can be executed before the received image processing job is executed;

executing the received image processing job when a response that indicates that the received image processing job can be executed is sent from the information processing apparatus as a result of the query in the query step; and notifying the information processing apparatus of a result of execution of the image processing job executed in the executing step; and by the information processing apparatus, managing a first printing amount that has already been printed by an image processing job executed within the image processing system and a second printing amount that is scheduled to be printed by an image processing job that has been transmitted from the first image processing apparatus to the second image processing apparatus and that has not yet been executed by the second image processing apparatus;

determining whether or not a total of the third printing amount that is scheduled to be printed by the received image processing job, the first printing amount and the second printing amount exceeds a predetermined upper limit in response to the query from the second image processing apparatus;

providing a response that indicates whether or not to permit execution of the received image processing job to the second image processing apparatus based on a result of determination in the determination step; and updating the first printing amount and a new second printing amount when a result of execution by the second image processing apparatus of the image processing job transmitted by the first image processing apparatus is sent from the second image processing apparatus;

wherein, when a result that indicates that the transmitted image processing job has not been executed properly by the second image processing apparatus is sent, the third printing amount is subtracted from the new second printing amount to obtain the original second printing amount, without updating the first printing amount.

12. A non-transitory computer-readable storage medium storing a computer program for causing a computer to execute the method for controlling an image processing system according to claim 9.

13. A non-transitory computer-readable storage medium storing a computer program for causing a computer to execute the method for controlling an image processing system according to claim 10.

14. A non-transitory computer-readable storage medium storing a computer program for causing a computer to execute the method for controlling an image processing system according to claim 11.

* * * * *